United States Patent
Honda

(10) Patent No.: US 10,715,064 B2
(45) Date of Patent: Jul. 14, 2020

(54) CONTROL DEVICE, OPTICAL DEVICE, CONTROL METHOD, AND STORAGE MEDIUM

(71) Applicant: CANON KABUSHIKI KAISHA, Tokyo (JP)

(72) Inventor: Hirofumi Honda, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 15/975,194

(22) Filed: May 9, 2018

(65) Prior Publication Data

US 2018/0331640 A1  Nov. 15, 2018

(30) Foreign Application Priority Data

May 10, 2017 (JP) ................. 2017-093592

(51) Int. Cl.
*H02P 8/18* (2006.01)
*H02P 6/15* (2016.01)
*H02P 8/22* (2006.01)

(52) U.S. Cl.
CPC ............. *H02P 8/18* (2013.01); *H02P 6/153* (2016.02); *H02P 8/22* (2013.01)

(58) Field of Classification Search
CPC .... H02P 8/14; H02P 8/822; H02P 8/04; H02P 6/34; H02P 27/08; H02P 6/24; H02P 6/153
See application file for complete search history.

(56) References Cited

U.S. PATENT DOCUMENTS

| | | | |
|---|---|---|---|
| 5,213,080 A * | 5/1993 | Lambert | F02B 75/16 123/406.65 |
| 5,856,893 A | 1/1999 | Mizutani | |
| 6,870,346 B2 * | 3/2005 | Davidov | H02P 8/04 318/608 |
| 7,085,200 B2 | 8/2006 | Okada et al. | |
| 2006/0012324 A1 | 1/2006 | Eskritt et al. | |
| 2013/0249456 A1 | 9/2013 | Inoue et al. | |
| 2013/0320892 A1 | 12/2013 | Inoue | |

(Continued)

FOREIGN PATENT DOCUMENTS

| | | |
|---|---|---|
| JP | 4165915 B2 | 10/2008 |
| JP | 2014039427 A | 2/2014 |
| JP | 2015023682 A | 2/2015 |

(Continued)

*Primary Examiner* — Rina I Duda
(74) *Attorney, Agent, or Firm* — Canon U.S.A., Inc. IP Division

(57) ABSTRACT

A control device for controlling a stepping motor includes at least one processor which function as a control unit configured to control the stepping motor through a first control method or a second control method by using a control signal, wherein the memory configured to store a plurality of locus data indicating a relationship between an advance angle and a rotation speed of the stepping motor at each waveform of the control signal, the advance angle being a phase difference between a phase corresponding to a rotation position of the stepping motor and a phase of the control signal, and wherein the control unit select one piece of locus data from the plurality of locus data stored in the memory before switching a control method between the first control method and the second control method.

21 Claims, 19 Drawing Sheets

(56) References Cited

U.S. PATENT DOCUMENTS

2015/0022139 A1* 1/2015 Yamanaka ................ H02P 8/14
318/696

FOREIGN PATENT DOCUMENTS

| JP | 2015023695 A | 2/2015 |
|----|--------------|--------|
| JP | 2015023703 A | 2/2015 |
| JP | 6004830 B2 | 10/2016 |
| JP | 2017134269 A | 8/2017 |

* cited by examiner

# CONTROL DEVICE, OPTICAL DEVICE, CONTROL METHOD, AND STORAGE MEDIUM

BACKGROUND

Field of the Disclosure

The present disclosure relates to a control device that controls a stepping motor through two control methods, such as an open loop control method and a feedback control method.

Description of the Related Art

A stepping motor is widely used for various kinds of motor control because highly precise positioning can be easily executed through open loop control. However, when the open loop control is executed, the stepping motor may step out if the stepping motor is rotated at high load or high speed.

Japanese Patent No. 6004830 discusses a control device which prevents a stepping motor from stepping out by executing feedback control in which an advance angle of a driving waveform with respect to a rotation phase and a driving voltage with respect to a rotation speed are controlled based on the rotation phase and the rotation speed of the stepping motor acquired from a position sensor. Japanese Patent No. 4165915 discusses a stepping motor control device which executes rotation control at high speed and high precision by switching the control between the feedback control and the open loop control according to a distance to a target position.

However, the control device described in Japanese Patent No. 6004830 requires a position sensor having high resolution, so that a configuration for acquiring the high resolution becomes complicated, and thus the cost is increased. In other words, if the position sensor has low detection resolution, a time lag arises in a period between start of activation of the motor and detection executed by the position sensor, and thus the feedback control cannot be executed in that period. Further, a detection cycle of the position sensor is longer in a low speed range, so that performance of the feedback control or positional precision with respect to the target position cannot be acquired sufficiently.

On the other hand, the stepping motor control device described in Japanese Patent No. 4165915 switches control between the feedback control and the open loop control according to a distance to the target position. Therefore, with this configuration, the above-described issue can be solved by executing the open loop control immediately after the motor is activated, or when positioning with respect to the target position is executed or the motor is rotated at low speed.

SUMMARY

According to an aspect of the present disclosure, a control device for controlling a stepping motor includes at least one processor which function as a control unit configured to control the stepping motor through a first control method or a second control method by using a control signal, wherein the memory configured to store a plurality of locus data indicating a relationship between an advance angle and a rotation speed of the stepping motor at each waveform of the control signal, the advance angle being a phase difference between a phase corresponding to a rotation position of the stepping motor and a phase of the control signal, and wherein the control unit select one piece of locus data from the plurality of locus data stored in the memory before switching a control method between the first control method and the second control method.

Further features of the present disclosure will become apparent from the following description of exemplary embodiments with reference to the attached drawings.

DESCRIPTION OF THE EMBODIMENTS

As described above, in Japanese Patent No. 4165915, the open loop control is used immediately after the motor is activated, or when positioning with respect to a target position is executed or the motor is rotated at low speed, so that an issue such as lowering of positional precision can be solved. However, the present disclosure has discovered that a speed level difference may occur in the stepping motor control device described in Japanese Patent No. 4165915 when control is switched between the open loop control and the feedback control.

Therefore, in the following exemplary embodiments, a control device capable of reducing fluctuation of a rotation speed of a motor occurring when control is switched between the open loop control and the feedback control, an optical device, and a control method thereof will be described.

Hereinafter, exemplary embodiments of the present disclosure will be described in detail with reference to the appended drawings.

Figure 1:
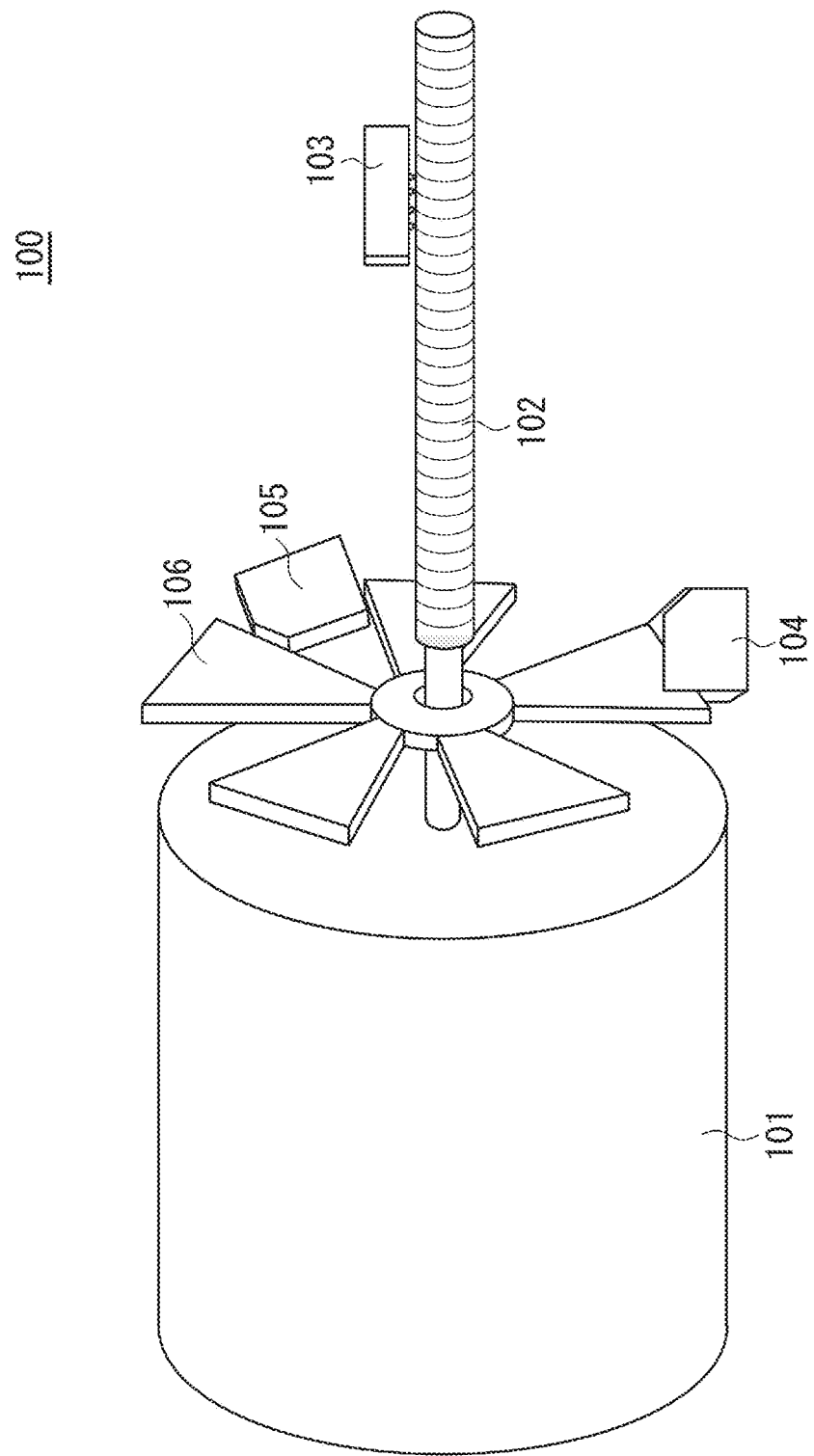
FIG. 1 provides an exemplary perspective view of a stepping motor, according to one or more aspect of the subject disclosure.

First, a schematic configuration of a motor unit of an exemplary embodiment will be described with reference to FIG. 1. FIG. 1 is a diagram illustrating a schematic configuration of a motor unit 100. In FIG. 1, the motor unit 100 includes a stepping motor 101, a rotation shaft 102 of the stepping motor 101, and a rack 103. The rotation shaft 102 serves as a lead screw which engages with the rack 103 to move a moving member (not illustrated) connected to the rack 103 in an axis direction according to rotation of the rotation shaft 102. A photo-interrupter is provided with a channel CH0 104 and a channel CH1 105. Hereinafter, the channels CH0 and CH1 of the photo-interrupter are expressed as "ch0-PI" and "ch1-PI" respectively. The motor unit 100 further includes a slit rotation plate 106. The slit rotation plate 106 is configured of a plurality of reflection portions and transmission portions having a same width. A number of reflection portions and transmission portions are set according to a number of poles of a motor. Normally, the number of reflection portions and transmission portions are set to 10 in total if the motor has ten poles.

Figure 2:
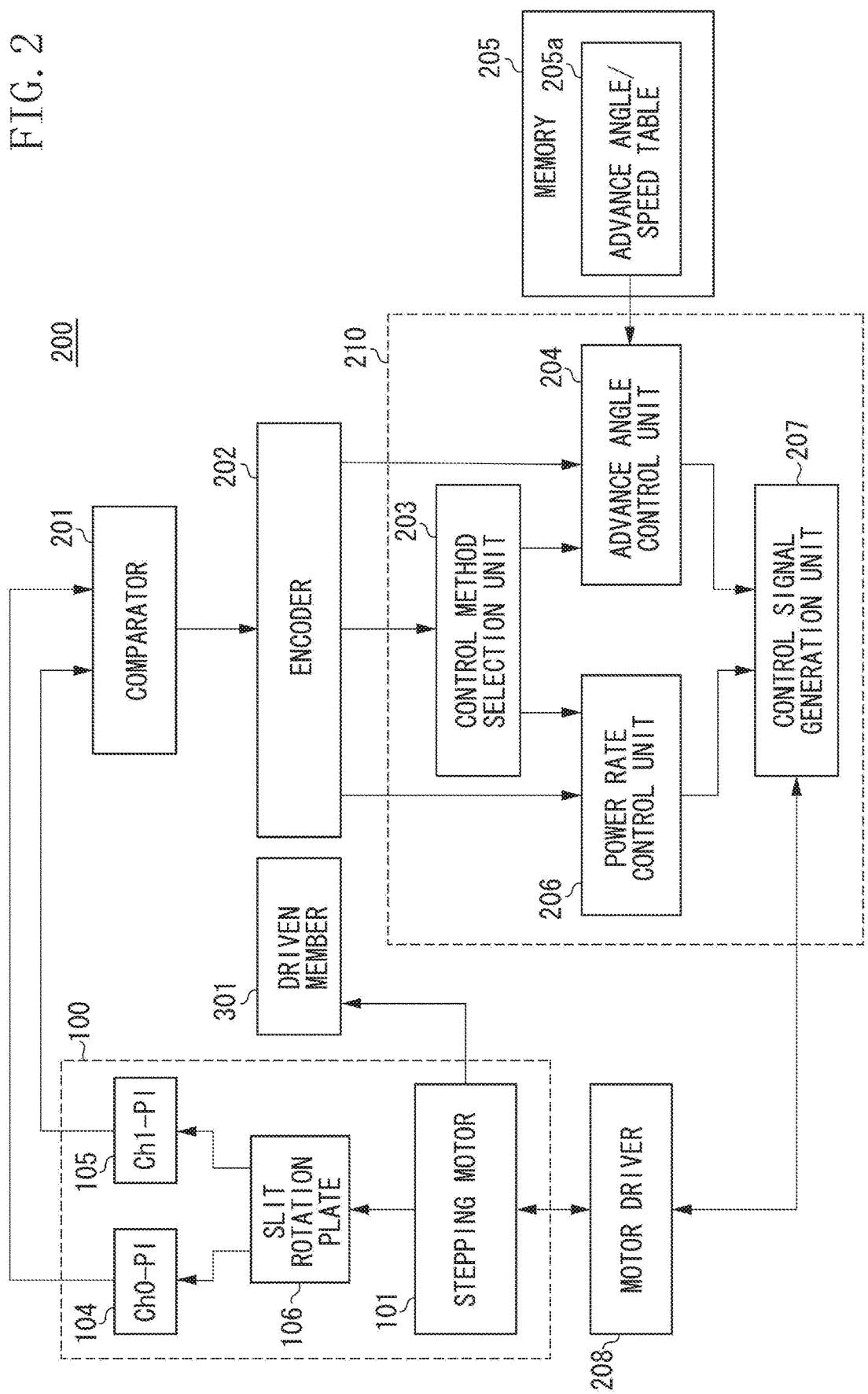
FIG. 2 is a block diagram of a motor control device for a stepping motor, according to one or more aspect of the subject disclosure.

A motor control device (a system including an electric motor driving circuit) of the present exemplary embodiment will be described with reference to FIG. 2. FIG. 2 is a block diagram illustrating a motor control device 200. The motor control device 200 includes the stepping motor 101, the channel ch0-PI 104, the channel ch1-PI 105, and the slit rotation plate 106 illustrated in FIG. 1. The stepping motor 101 drives a driven member 301. For example, the driven member 301 is an optical element, such as a lens or a diaphragm, arranged on a lens device or a imaging device. If the driven member 301 is a lens, the lens as the driven member 301 moves in an optical axis direction according to rotation of the stepping motor 101. However, the present exemplary embodiment is not limited thereto, and the stepping motor 101 can drive a driven member other than the optical element.

A comparator 201 binarizes analog input signals detected by the channel ch0-PI 104 and the channel ch1-PI 105. An encoder 202 detects a rising edge and a falling edge of the signal binarized by the comparator 201. The encoder 202 further detects a rotation speed (motor rotation speed) and a rotation phase of the stepping motor 101 and outputs a pulse input (PI) detection interrupt signal.

According to the PI detection interrupt signal output from the encoder 202, a control method selection unit 203 selects any one of an open loop control method (first control method) and a feedback control method (second control method). The control method selection unit 203 will be described below in detail. The motor control device 200 further includes an advance angle control unit 204, a memory (storage unit) 205 that stores an advance angle/speed table 205a, and a power rate control unit 206. The advance angle control unit 204, the advance angle/speed table 205a, and the power rate control unit 206 will be described below in detail. A control signal generation unit 207 generates a pulse width modulation (PWM) signal for driving a motor, and outputs the PWM signal to a motor driver 208 as a control signal (motor control signal). The control signal generation unit 207 realizes micro-step driving of the stepping motor 101 by sequentially switching the duty of the PWM signal. The motor driver 208 amplifies the control signal generated by the control signal generation unit 207 to generate a motor driving signal and supplies the motor driving signal to the stepping motor 101.

In the present exemplary embodiment, the control method selection unit 203, the advance angle control unit 204, the power rate control unit 206, and the control signal generation unit 207 are included in a control unit 210 (control unit) for controlling the stepping motor 101. The control unit 210 uses a control signal (a motor control signal or a motor driving signal) to control the stepping motor 101 through the open loop control method (first control method) or the feedback control method (second control method). The memory 205 stores a plurality of locus data (voltage profile) indicating a relationship between the advance angle as a phase difference between a phase corresponding to a rotation position of the stepping motor 101 and a phase of the control signal and the rotation speed of the stepping motor 101. The control unit 210 selects one piece of locus data from a plurality of locus data stored in the memory 205 when the control method is switched between the first control method and the second control method. Herein, a waveform of the control signal is an amplitude of the control signal, and the waveform corresponds to a duty difference of a PWM signal if the control signal is the PWM signal. In addition, a waveform of the control signal (i.e., an output signal of the control signal generation unit 207) corresponds to a waveform of the motor driving signal (i.e., an output signal of the motor driver 208).

Figure 3:
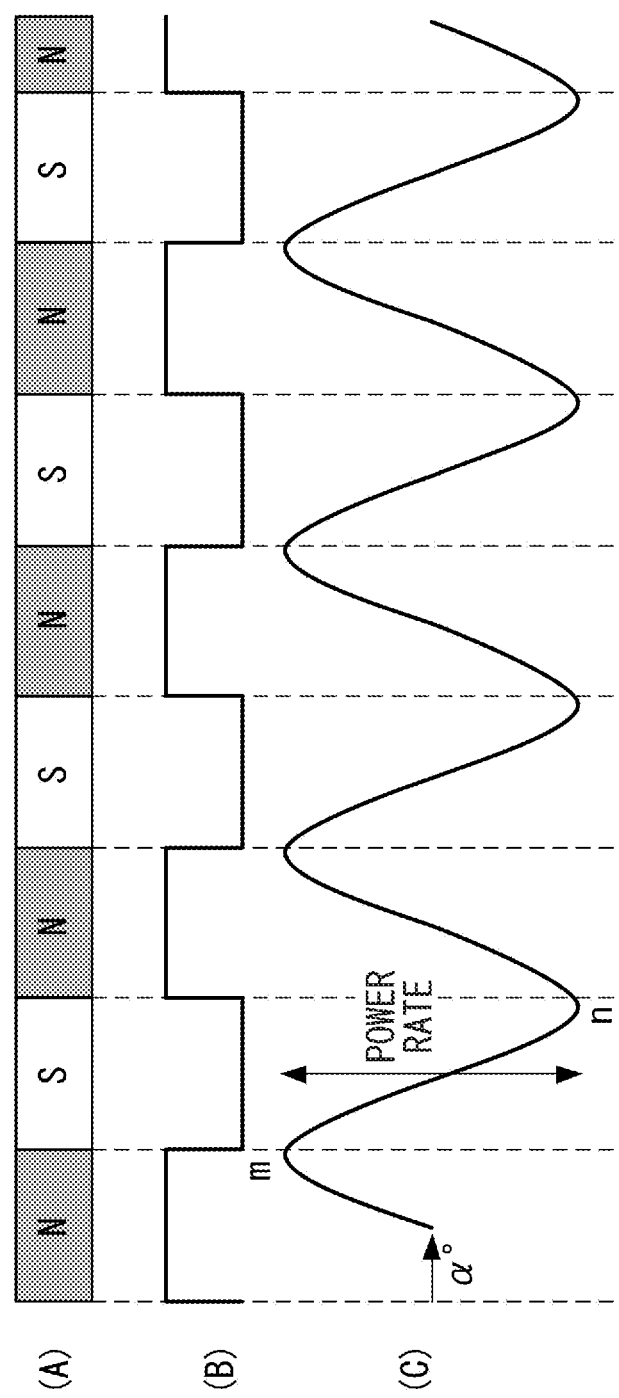
FIG. 3 is a diagram illustrating a relationship between a rotation phase, a pulse input (PI) signal, and a motor control signal for a stepping motor, according to one or more aspect of the subject disclosure

Next, processing executed by the control unit. 210 (the advance angle control unit 204 and the power rate control unit 206) will be described with reference to FIG. 3. FIG. 3 is a diagram illustrating a relationship between the rotation phase, the PI signal, and the motor control signal of the stepping motor 101. FIG. 3 includes a rotation phase (rotation position) of a rotor portion f the stepping motor 101 viewed from a position of the channel ch0-PI 104 (A), an output waveform (PI signal) of the channel ch0-PI 104 (B), and the motor control signal (C). Herein, although the relationship is described by making the channel ch0-PI 104 as a reference, a similar relationship is also established if the channel ch1-PI 105 is taken as a reference. In this case, FIG. 3A illustrates a rotation phase (position) of the rotor portion of the stepping motor 101 viewed from a position of the channel ch1-PI 105, FIG. 3B illustrates an output waveform (PI signal) of the channel ch1-PI 105, and FIG. 3C illustrates a motor control signal.

As illustrated in FIG. 3, an advance angle α-degree corresponds to a phase difference between the rotation phase of the rotor portion of the stepping motor 101 and the phase of the motor control signal. The advance angle α-degree is controlled (i.e., corrected, adjusted, or set) by the advance angle control unit 204. As illustrated in FIG. 3, a power rate corresponds to an amplitude of the motor control signal (a control signal generated by the control signal generation unit 207). The power rate is controlled (i.e., corrected, adjusted, or set) by the power rate control unit 206. For the sake of simplicity, the motor control signal is expressed as a signal that expresses the duty of the PWM signal as a waveform. Accordingly, for example, the power rate of 100% corresponds to a state where the duty difference of the PWM signal between a point m and a point n in the motor control signal (C) of FIG. 3 is 100% (i.e., the duty is 100% and 0% at the points m and n, respectively). Further, for example, the power rate of 50% corresponds to a state where the duty difference between the point m and the point n is 50% (i.e., the duty is 75% and 25% at the points m and n, respectively).

Figure 4:
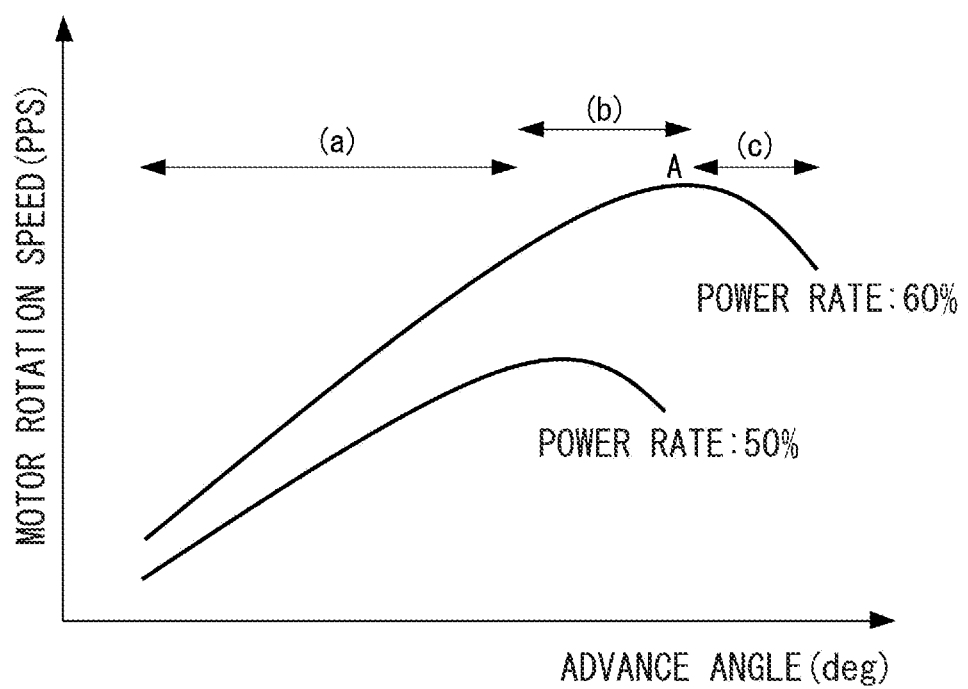
FIG. 4 is a diagram illustrating a relationship between an advance angle and a motor rotation speed of a stepping motor, according to one or more aspect of the subject disclosure

A relationship between the advance angle and the motor rotation speed will be described with reference to FIG. 4. FIG. 4 is a diagram illustrating a relationship between the advance angle and the motor rotation speed at power rates of 60% and 50%. When the power rate is 60%, the motor rotation speed is increased in proportion to an increase in the advance angle in an area "a". However, if the advance angle is further increased, a rise of the motor rotation speed with respect to the advance angle is gradually saturated. If the advance angle is increased further, the motor rotation speed enters an area "c" where the motor rotation speed starts dropping at a saturation point A. Further, if the power rate is greater, an inclination of the motor rotation speed with respect to the advance angle in the area "a" becomes steeper, and the saturation point A is shifted toward the smaller advance angle.

Figure 5:
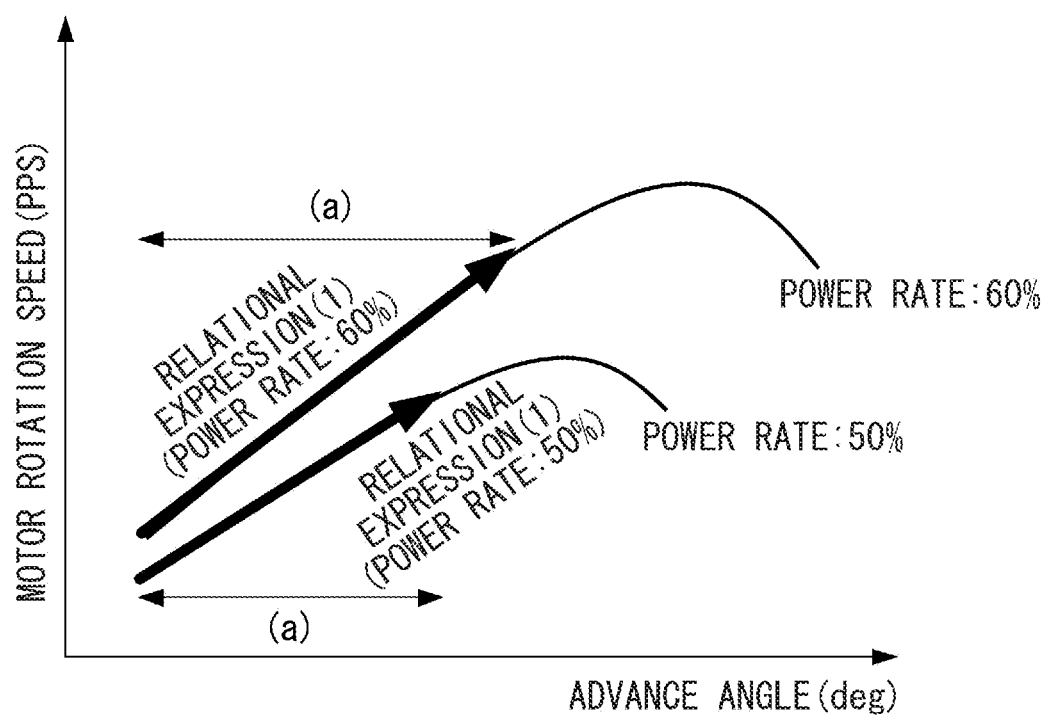
FIG. 5 is a diagram illustrating a relational expression of an advance angle and a motor rotation speed of a stepping motor, according to one or more aspect of the subject disclosure.

Subsequently, the advance angle control unit 204 and the advance angle/speed table 205a will be described with reference to FIG. 5. FIG. 5 is a diagram illustrating a relational expression of the advance angle and the motor rotation speed. As described above, the advance angle and the motor rotation speed have a relationship proportional within a range of the area "a". In other words, the relationship between the advance angle and the speed can be expressed by the following relational expression 1, Motor Rotation Speed=Advance Angle×γ+β Relational Expression 1 (γ: inclination, β: offset)

Therefore, as illustrated in FIG. 5, measurement data is acquired by previously measuring a relationship between the advance angle and the motor rotation speed at each power rate. Then, based on the measurement data, the inclination γ, the offset β, and an effective area W (the area "a" illustrated in FIG. 5) of the relational expression at each power rate are associated with each other and stored in the memory 205 as the advance angle/speed table 205a. In other words, the memory 205 stores a combination of the inclination γ, the offset β, and the effective area W at each power rate as the advance angle/speed table 205a. The advance angle/speed table 205a is a plurality of locus data stored at each waveform of the control signal, which indicates a relationship between the advance angle and the motor rotation speed. As described below, when the control method is switched between the first control method and the second control method, the control unit 210 selects one piece of locus data from a plurality of locus data stored in the memory 205. In the present exemplary embodiment, the locus data is locus data which includes the target speed (target rotation speed) of the stepping motor 101, which falls within a range in which a correspondence relationship between the advance angle and the rotation speed is approximated linearly.

In the present exemplary embodiment, the memory 205 stores a parameter acquired by measuring the relationship between the advance angle and the rotation speed as the locus data. Further, the memory 205 can store coefficient data in an approximate expression based on a relationship between the advance angle and the rotation speed acquired through measurement as the locus data. In a case where specific locus data based on the relationship between the advance angle and the rotation speed which is detected during control of the stepping motor 101 is not stored in the memory 205, the control unit 210 can select locus data that is the closest to the specific locus data from the plurality of stored locus data. Further, in a case where specific coefficient data based on the relationship between the advance angle and the rotation speed which is detected during control of the stepping motor 101 is not stored in the memory 205, the control unit 210 can correct the coefficient data stored in the memory 205.

Figure 6:
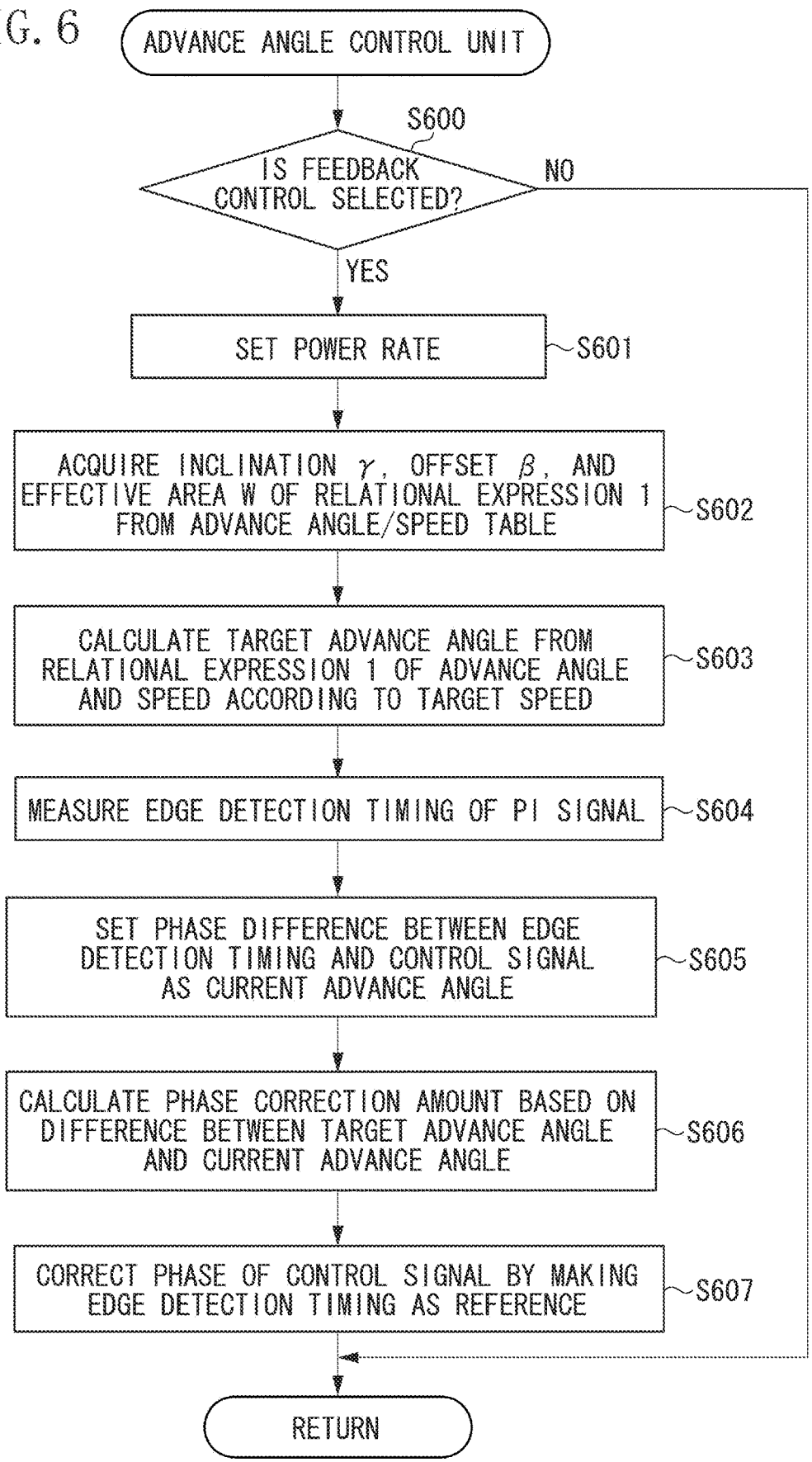
FIG. 6 is a flowchart illustrating processing executed by an advance angle control unit, according to one or more aspect of the subject disclosure.

Next, processing executed by the advance angle control unit 204 will be described with reference to FIG. 6. FIG. 6 is a flowchart illustrating the processing executed by the advance angle control unit 204. The advance angle control unit 204 starts the processing based on the PI detection interrupt signal transmitted from the encoder 202.

First, in step S600, the advance angle control unit 204 determines whether the feedback control is selected by the control method selection unit 203. In a case where the feedback control is not selected (NO in step S600), the processing is ended. On the other hand, in a case where the feedback control is selected (YES in step S600), the processing proceeds to step S601. In step S601, the advance angle control unit 204 sets the power rate selected by the control method selection unit 203. Then, in step S602, the advance angle control unit 204 acquires a relational expression 1 (an inclination γ and an offset β) corresponding to the power rate set in step S601 and an effective area W of the relational expression 1.

In step S603, the advance angle control unit 204 uses the relational expression 1 corresponding to the advance angle and the speed acquired in step S602 to calculate an advance angle (target advance angle) according to a target speed. In step S604, the advance angle control unit 204 detects a rising edge or a falling edge of a ch0-PI signal or a ch1-PI signal detected by the encoder 202, and measures an edge detection timing (i.e., a rotation phase of the stepping motor 101). Then, in step S605, the advance angle control unit 204 sets a phase difference between the measured edge detection timing (a rotation phase) and the control signal (a phase of the control signal) generated by the control signal generation unit 207 as a current advance angle (an amount of the current advance angle).

In step S606, the advance angle control unit 204 calculates a correction amount (phase correction amount) based on a difference between the target advance angle calculated in step S603 and the current advance angle set in step S605. In this step, in order to prevent rapid fluctuations of speed caused by correction of the advance angle, the advance angle control unit 204 calculates the correction amount by multiplying a difference between the target advance angle and the current advance angle by a time constant "t". The advance angle control unit 204 takes a predetermined time period to complete shifting of the current advance angle to the target advance angle by using the correction amount calculated in step S606. Then, in step S607, the advance angle control unit 204 corrects (adjusts) the phase of the signal (motor control signal) generated by the control signal generation unit 207 by making the measured edge detection timing as a reference. Then, the processing is ended.

Figure 7:
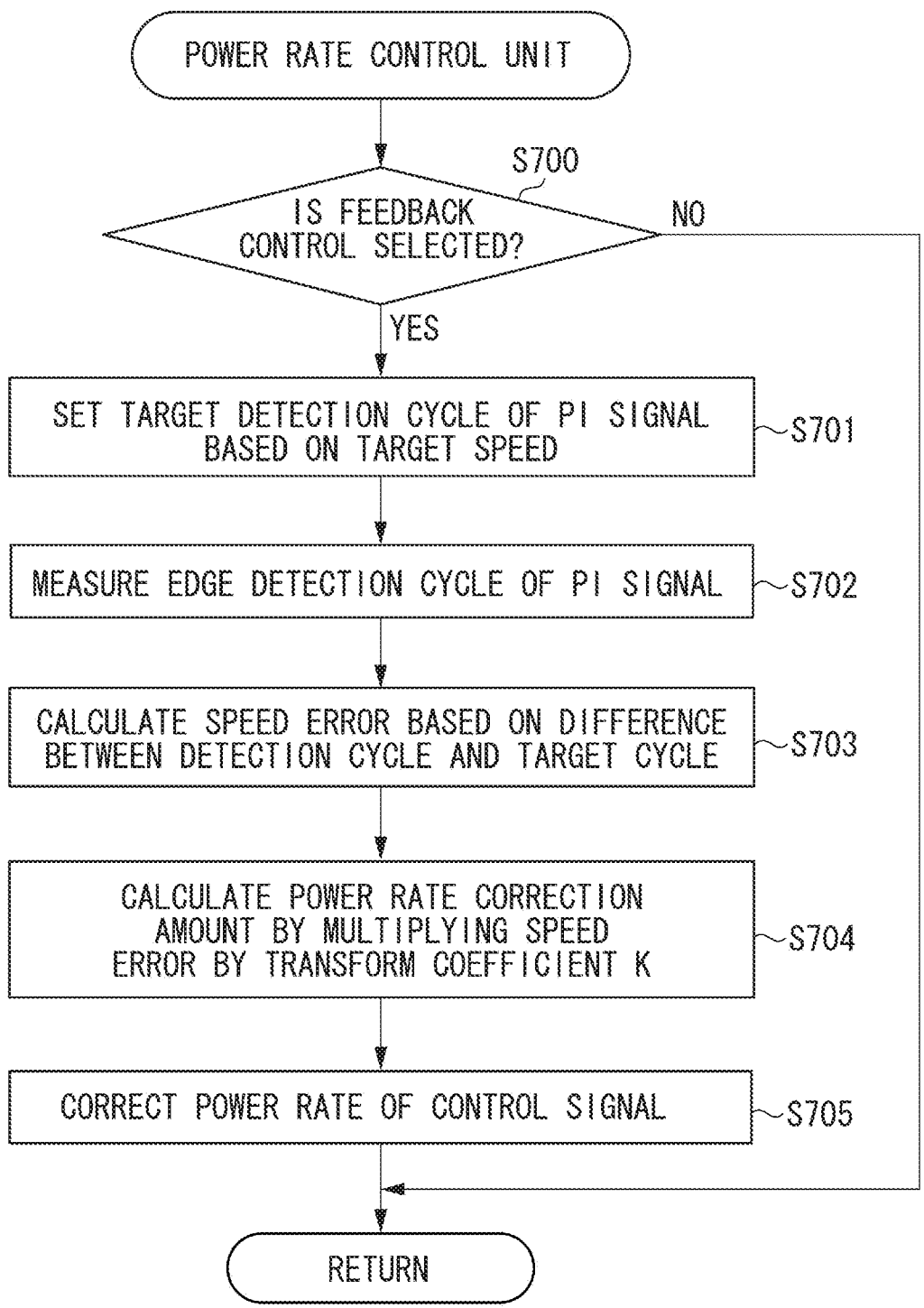
FIG. 7 is a flowchart illustrating processing executed by a power rate control unit, according to one or more aspect of the subject disclosure

Next, processing executed by the power rate control unit 206 will be described with reference to FIG. 7. FIG. 7 is a flowchart illustrating the processing executed by the power rate control unit 206. The power rate control unit 206 starts the processing based on the PI detection interrupt signal transmitted from the encoder 202.

First, in step S700, the power rate control unit 206 determines whether the feedback control is selected by the control method selection unit 203. In a case where the feedback control is not selected (NO in step S700), the processing is ended. On the other hand, in a case where the feedback control is selected (YES step S700), the processing proceeds to step S701. In step S701, the power rate control unit 206 sets a target detection cycle of the PI signal calculated based on the target speed. In step S702, the power rate control unit 206 measures a detection cycle of the rising/falling edge detected from the ch0-PI signal or the ch1-PI signal.

In step S703, the power rate control unit 206 acquires a speed error based on a difference between the detection cycle measured in step S702 and the target cycle set in step S701. In step S704, the power rate control unit 206 calculates a correction amount (power rate correction amount) by multiplying the speed error acquired in step S703 by a transform coefficient K. Then, in step S705, the power rate control unit 206 corrects (adjusts) the power rate of the control signal generated by the control signal generation unit. 207 by using the correction amount calculated in step S704. An integral term (a value which "a pile" of previous speed errors are added up by a predetermined ratio) or a derivative term (a value which an amount fluctuated from the previous speed error is added up by a predetermined ratio) can be used for the speed error calculated in step S703 in addition to the above-described proportional (a difference between the detection cycle and the target cycle). As described above, by using the integral term or the derivative term in addition to the proportional, the power rate can be controlled more stably.

Figure 8:
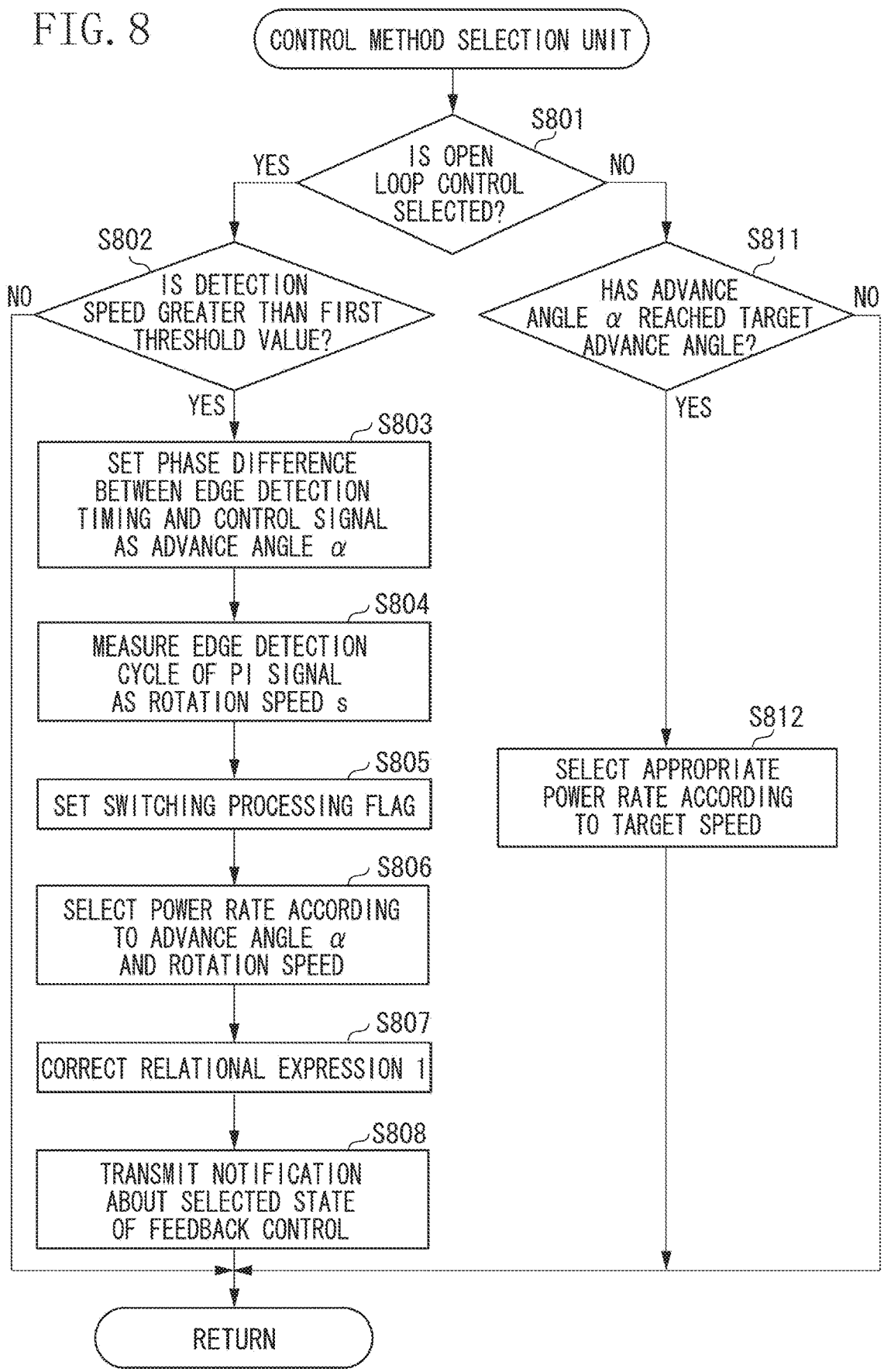
FIG. 8 is a flowchart illustrating processing executed by a control method selection unit of a first exemplary embodiment of a stepping motor, according to one or more aspect of the subject disclosure.

Subsequently, a first exemplary embodiment of the present disclosure will be described. The present exemplary embodiment relates to the processing executed by the control method selection unit 203 when the open loop control is switched to the feedback control. First, the processing executed by the control method selection unit 203 of the present exemplary embodiment will be described with reference to FIG. 8. FIG. 8 is a flowchart illustrating the processing executed by the control method selection unit 203.

First, in step S801, the control method selection unit 203 determines whether the current control is the open loop control. In a case where the current control is the open loop control (YES in step S801), the processing proceeds to step S802. In step S802, the control method selection unit 203 measures the detection cycle (detection speed) of the rising/falling edge detected from the ch0-PI signal or the ch1-PI signal, and determines whether the measured detection cycle (detection speed) is greater than a first threshold value. Herein, a motor rotation speed that can be stably controlled by the feedback control is set as the first threshold value. In other words, if the rotation speed becomes lower, a detection interval (detection cycle) of the rising/falling edge of the PI signal detected by the encoder 202 through the channel ch0-PI 104 or the channel ch1-PI 105 is longer. Because a control cycle is longer if the detection interval is longer, fluctuation of speed caused by fluctuation of load cannot be corrected at an appropriate timing, so that it will be difficult to stably execute rotation control. Therefore, in a low rotation range such as the activation period in which the motor is rotated at a speed of the first threshold value or less, the motor has to be activated (controlled) by the open loop control.

In a case where the detection speed is the first threshold value or less (NO in step S802), the processing is ended. On the other hand, in a case where the detection speed is greater than the first threshold value (YES in step S802), the processing proceeds to step S803. In step S803, the control method selection unit 203 measures a phase difference between the edge detection timing (rotation phase) of the PI signal detected by the encoder 202 and the control signal (a phase of the control signal) generated by the control signal generation unit 207. Then, the control method selection unit 203 sets the measured phase difference as the advance angle α. In step S804, the control method selection unit 203 measures the edge detection cycle of the PI signal and sets the measured edge detection cycle as the rotation speed. In step S805, the control method selection unit 203 sets a switching processing flag indicating a state where the open loop control is being switched to the feedback control.

Figure 9A:
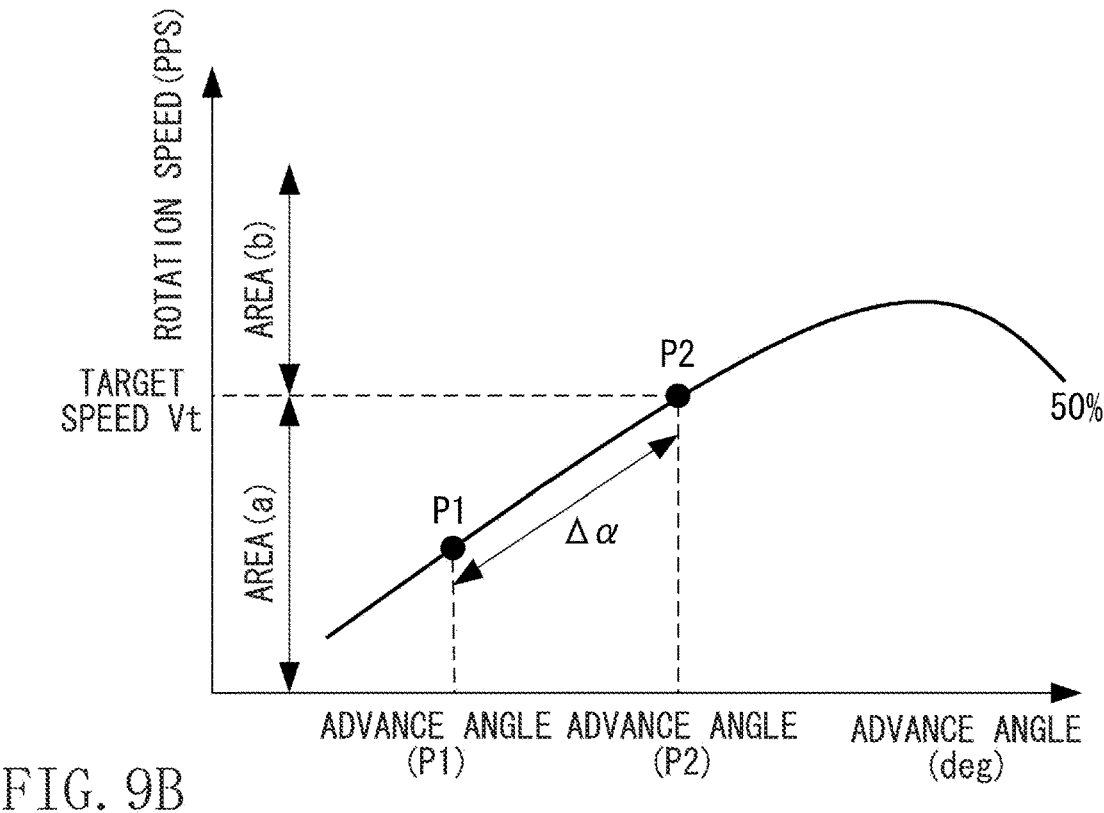
FIGS. 9A and 9B are diagrams illustrating issues arising when the open loop control is switched to the feedback control, according to one or more aspect of the subject disclosure.
Figure 9B:
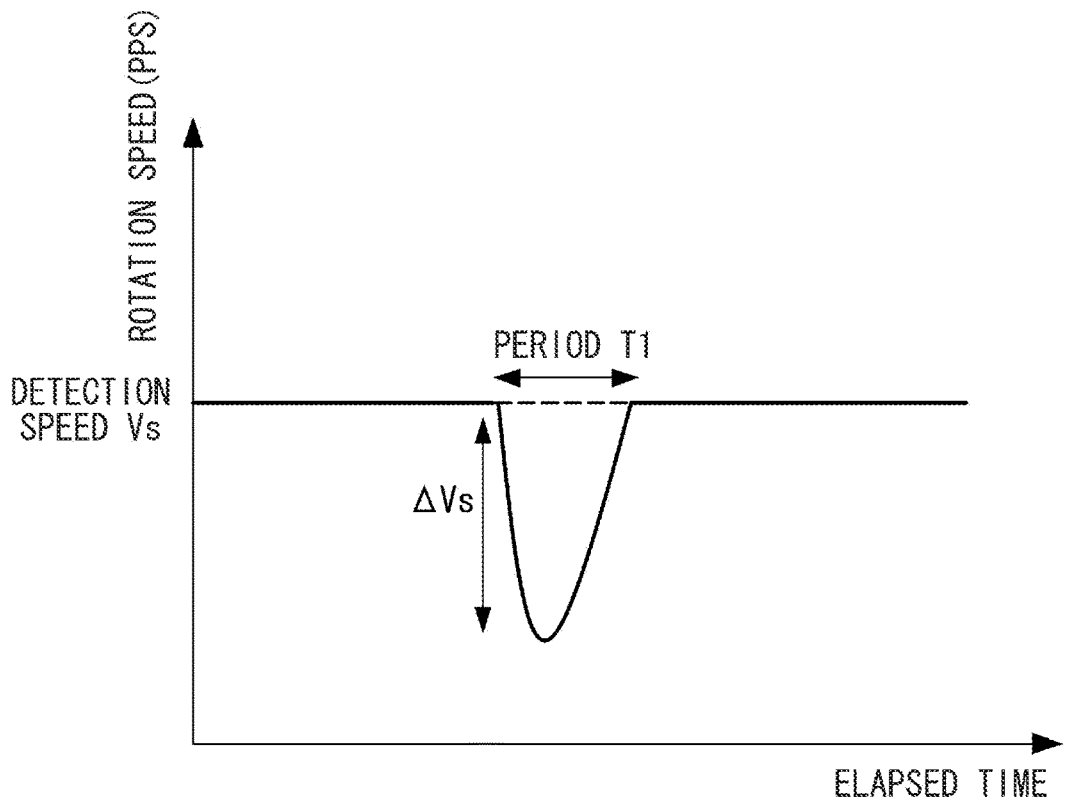

Herein, an issue occurring when the open loop control is switched to the feedback control will be described with reference to FIGS. 9A and 9B. FIGS. 9A and 9B are diagrams illustrating an issue occurring when the open loop control is switched to the feedback control. FIG. 9A illustrates a relationship between the advance angle α and the rotation speed, and FIG. 9B illustrates chronological change of the rotation speed when the open loop control is switched to the feedback control.

In the example described below, a relatively high power rate of 90% is set as the power rate of the open loop control in order to prevent the stepping motor 101 from stepping out, and the power rate of 50% that is appropriate for the target speed Vt is set as the power rate of the feedback control. In the present exemplary embodiment, although the target speed Vt is set as the rotation speed of a time point when the open loop control is switched to the feedback control, the exemplary embodiment is not limited thereto. The appropriate power rate refers to a power rate at which appropriate torque can be acquired without waste. If wasteful torque can be eliminated, an effect of reducing vibration or noise can be acquired in addition to saving electric power.

In FIG. 9A, an area "a" is a speed area of the open loop control, and an area "b" is a speed area of the feedback control. The stepping motor 101 is activated and accelerated by the open loop control, and when the speed has reached the feedback control area at the point P1, the power rate of 50% is selected as the power rate appropriate for the target speed Vt, and the feedback control is started. However, in the open loop control, the stepping motor 101 is rotationally driven in a state where the power rate is set to be relatively high at 90% in order to prevent the stepping motor 101 from stepping out, and the advance angle is non-constant. In this state, if the feedback control is started by setting the power rate to 50%, at the time of starting the feedback control, the advance angle may be the advance angle P1 corresponding to the point P1, which is different from the advance angle P2 corresponding to toe point P2 necessary for acquiring the target speed Vt. In this case, as illustrated in FIG. 9B, a speed level difference ΔVs as the fluctuation of the detection speed Vs may occur in a period T1 from switching of control to completion of acquisition of the advance angle.

In order to solve the above-described issue, in the present exemplary embodiment, in step S806 in FIG. 8, a power rate is selected according to the advance angle α (deg) and the rotation speed "s" of a time point before control is switched to the feedback control from the open loop control. In other words, the control unit 210 selects one piece of locus data from the plurality of locus data stored in the memory 205 to reduce the fluctuation (speed level difference ΔVs) of the rotation speed occurring when the control method is switched between the first control method and the second control method.

If a power rate corresponding to a specific combination of the advance angle and the rotation speed is not included in the advance angle/speed table 205a, a power rate corresponding to a combination closest to the specific combination of the advance angle and the rotation speed is selected from the advance angle/speed table 205a. In this case, it is necessary to execute correction processing with respect to the inclination γ and the offset β acquired from the advance angle/speed table 205a. In other words, in step S807, the control method selection unit 203 corrects the relational expression 1 relating to the inclination γ and the offset β. As described above, the control method selection unit 203 finely adjusts the inclination γ or the offset β according to the target speed to acquire the relational expression 1 of the target advance angle and the target rotation speed.

Then, in step S808, the control method selection unit 203 notifies the advance angle control unit 204 and the power rate control unit 206 about the selected state of the feedback control. With this notification, processing executed by the advance angle control unit 204 and the power rate control unit 206 is switched to the feedback control from the open loop control. When the open loop control has been switched to the feedback control, the processing proceeds to step S811 from step S801. In step S811, the control method selection unit 203 determines whether the advance angle α has reached the target advance angle. In a case where the advance angle α has not reached the target advance angle (NO in step S811), the processing is ended. On the other hand, in a case where the advance angle α has reached the target advance angle (YES in step S811), the processing proceeds to step S812. In step S812, the control method selection unit 203 selects the appropriate power rate described above according to the target speed. Then, the advance angle control unit 204 and the power rate control unit 206 continuously execute feedback control of the stepping motor 101 based on the appropriate power rate.

Figure 10:
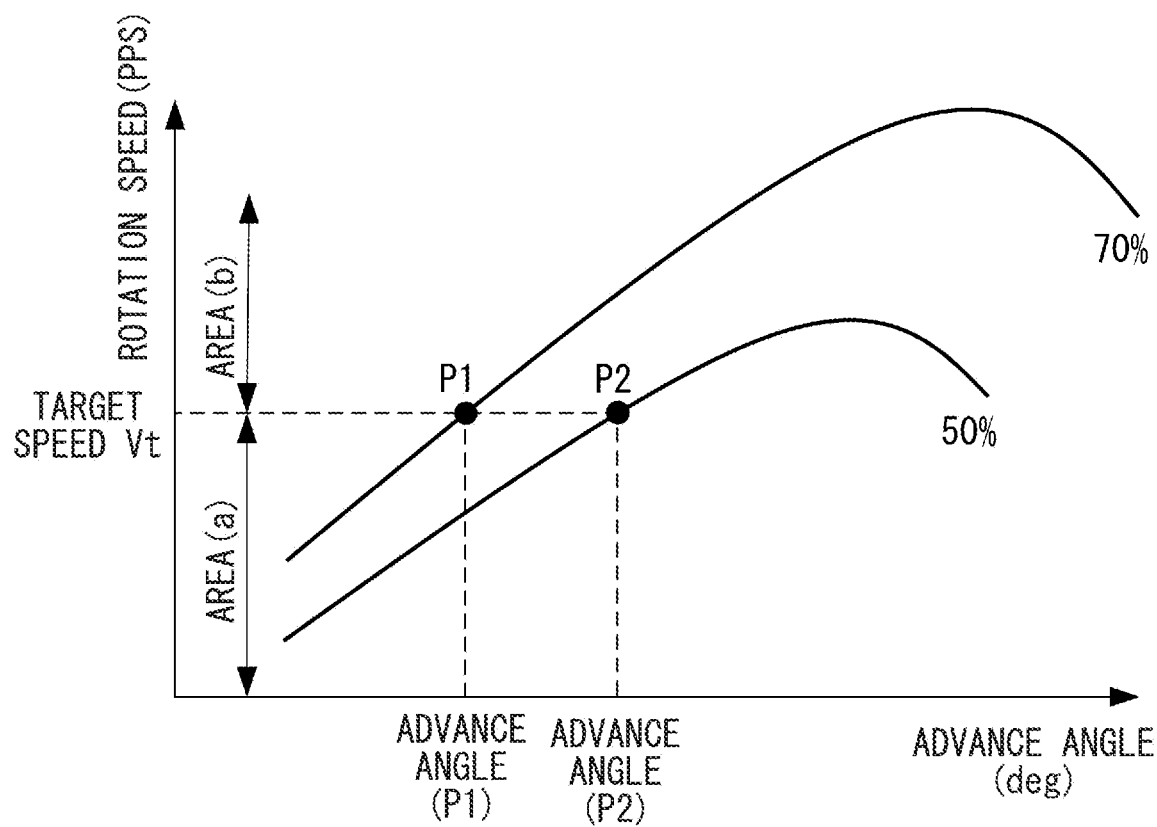
FIG. 10 is a diagram illustrating switching processing of the first exemplary embodiment of a stepping motor, according to one or more aspect of the subject disclosure.

A flow of processing for switching the open loop control to the feedback control will be described with reference to FIG. 10. FIG. 10 is a diagram illustrating switching processing. In the example described below, a relatively high power rate of 90% is set as the power rate of the open loop control in order to prevent the stepping motor 101 from stepping out, and the power rate of 50% that is appropriate for the target speed Vt is set as the power rate of the feedback control. Further, in the below-described example, a power rate of 70% is selected as the power rate according to the advance angle α (deg) and the rotation speed "s" of a time point before control is switched to the feedback control from the open loop control.

In FIG. 10, an area "a" is a speed area of the open loop control, and an area "b" is a speed area of the feedback control. The stepping motor 101 is activated and accelerated by the open loop control, and when the speed has reached the feedback control area at the point P1 in step S802, the advance angle P1 and the rotation speed corresponding to the point P1 before the open loop control is switched to the feedback control are detected in steps S803 and S804. Then, the corresponding power rate of 70% is set in step S806. Then, in a state where the power rate is set to 70%, processing of switching, the open loop control to the feedback control is executed in step S808. After the control is switched to the feedback control, the point P2 (the advance angle P2 and the target speed Vt) at which the power rate becomes the appropriate power rate of 50% is selected according to the target speed Vt, and the feedback control is executed continuously.

In the present exemplary embodiment, data stored in the memory 205 as the advance angle/speed table 205a is set based on the measurement data of the rotation speed with respect to the advance angle measured previously. Further, in order to reduce the capacity of the advance angle/speed table 205a, although the inclination γ and the offset of the relational expression 1 generated based on the measurement data and the effective area W of the relational expression 1 are used as the data to be stored, the measurement data itself can be stored. In this case, correction of the relational expression 1 executed in step S807 corresponds to correction of the parameter data itself.

As described above, in the present exemplary embodiment, when the first control method is switched to the second control method, the control unit 210 acquires the advance angle and the rotation speed while control is being executed through the first control method. Then, the control unit 210 selects one piece of locus data from the plurality of locus data stored in the memory 205 based on the combination of the advance angle and the rotation speed acquired while control is being executed through the first control method, and starts executing control through the second control method based on the one piece of locus data. Therefore, according to the present exemplary embodiment, it is possible to reduce the speed level difference occurring when the open loop control is switched to the feedback control.

Figure 11:
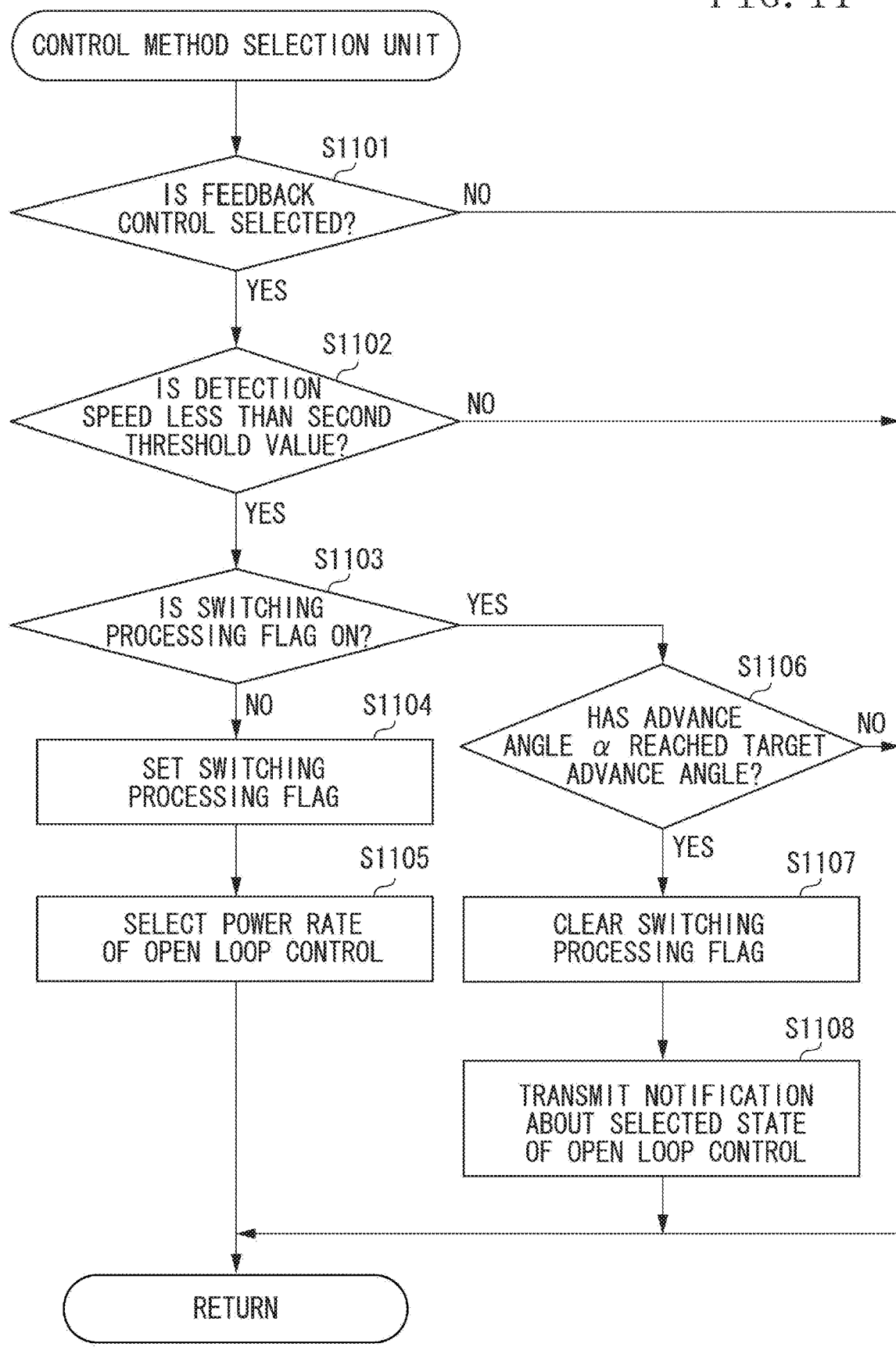
FIG. 11 is a flowchart illustrating processing executed by the control method selection unit of a second exemplary embodiment of a stepping motor, according to one or more aspect of the subject disclosure.

Subsequently, a second exemplary embodiment of the present disclosure will be described. The present disclosure relates to the processing of the control method selection unit 203 when the feedback control is switched to the open loop control. First, the processing of the control method selection unit 203 of the present exemplary embodiment will be described with reference to FIG. 11. FIG. 11 is a flowchart illustrating the processing of the control method selection unit 203.

First, in step S1101, the control method selection unit 203 determines whether the current control is the feedback control. In a case where the current control is not the feedback control (NO in step S1101), the processing is ended. On the other hand, in a case where the current control is the feedback control (YES in step S1101), the processing proceeds to step S1102. In step S1102, the control method selection unit 203 measures the detection cycle (detection speed) of the rising/falling edge detected from the ch0-PI signal or the ch1-PI signal and determines whether the measured detection cycle (detection speed) is less than the second threshold value. Herein, a motor rotation speed that can be stably controlled by the feedback control is set as the second threshold value. In other words, if the rotation speed becomes lower, the detection interval (detection cycle) of the rising/falling edge of the PI signal detected by the encoder 202 through the channel ch0-PI 104 or the channel ch1-PI 105 is longer. Because a control cycle is longer if the detection interval is longer, fluctuation of speeds caused by fluctuation of loads cannot be corrected at an appropriate timing, so that it will be difficult to stably execute rotation control. On the other hand, when the motor is to be stopped at the target position, positioning has to be precisely executed by rotating the motor at low speed. Therefore, in a low rotation range in which the motor is rotated at a speed less than the second threshold value, e.g., a period in which the motor is to be stopped at the target position, the motor has to be stopped (controlled) by the open loop control.

In step S1102, in a case where the detection speed is the second threshold value or more (NO in step S1102), the processing is ended. On the other hand, in a case where the detection speed is less than the second threshold value (YES in step S1102), the processing proceeds to step S1103. In step S1103, the control method selection unit 203 determines whether processing of switching the feedback control to the open loop control is being executed, i.e., whether the switching processing flag is ON. In a case where the switching processing flag is OFF (NO in step S1103), the processing proceeds to step S1104. In step S1104, the control method selection unit 203 sets the switching processing flag indicating a state where the feedback control is being switched to the open loop control.

Figure 12A:
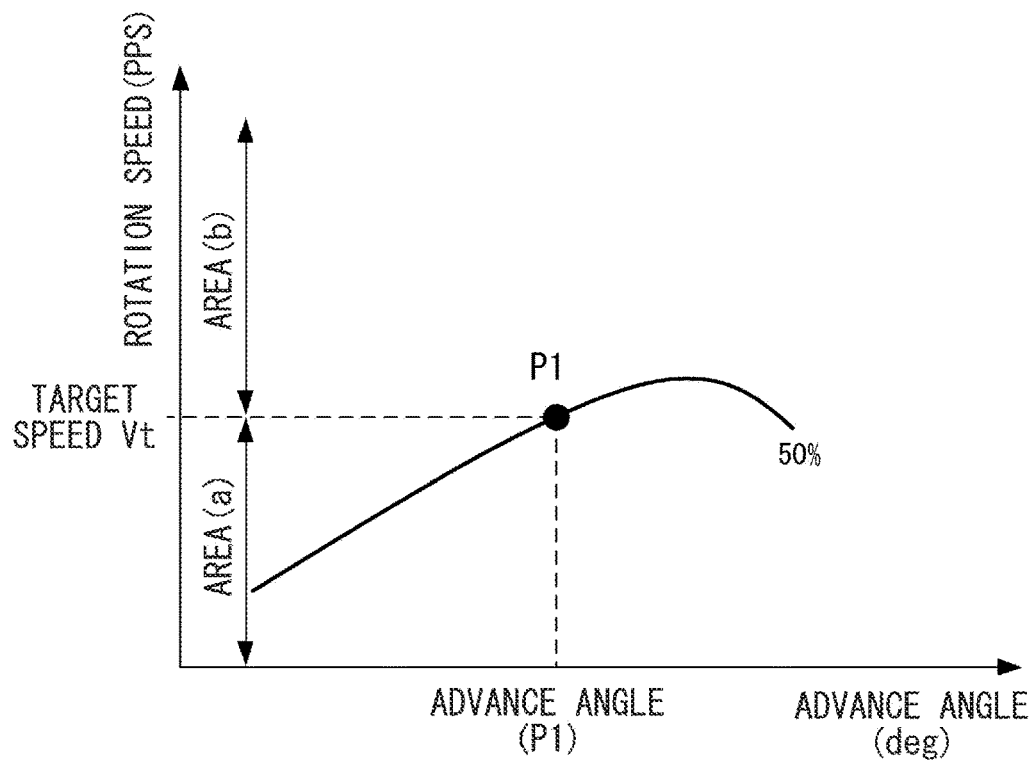
FIGS. 12A and 12B are diagrams illustrating issues arising when the feedback control is switched to the open loop control, according to one or more aspect of the subject disclosure.
Figure 12B:
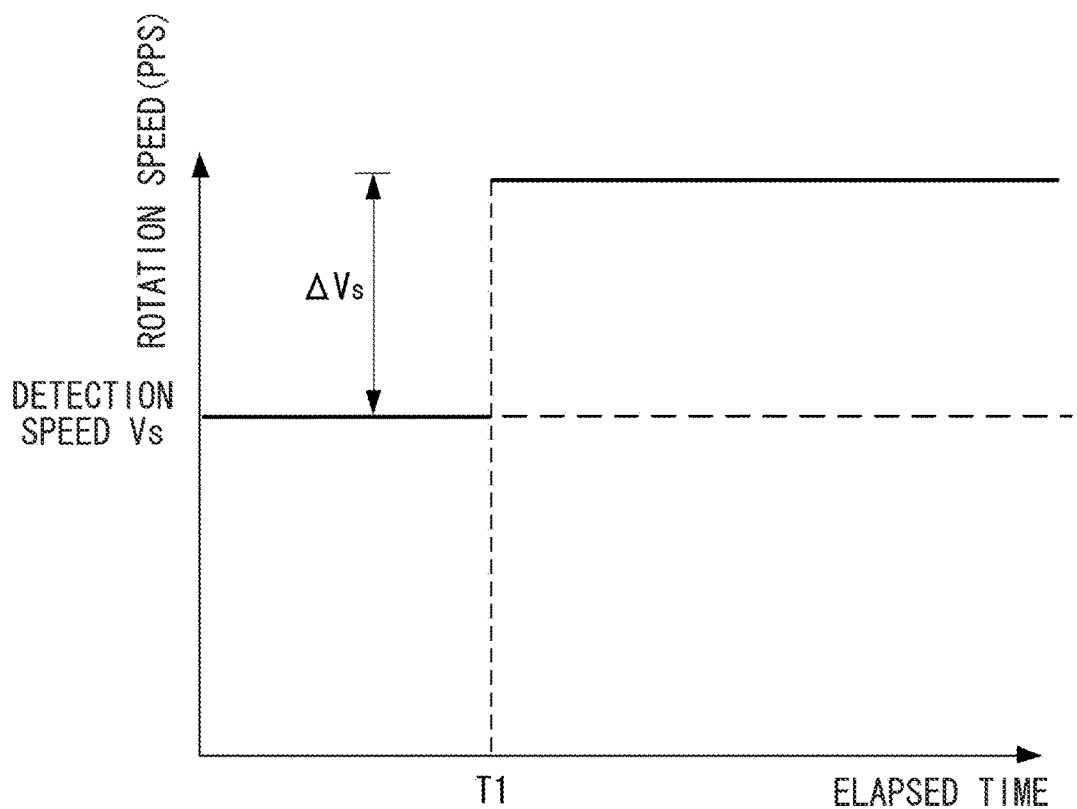

Herein, an issue occurring when the feedback control is switched to the open loop control will be described with reference to FIGS. 12A and 12B. FIGS. 12A and 12B are diagrams illustrating an issue occurring when the feedback control is switched to the open loop control. FIG. 12A illustrates a relationship between the advance angle α and the rotation speed, and FIG. 12B illustrates chronological change of the rotation speed when the feedback control is switched to the open loop control.

In the example described below, a relatively high power rate of 90% is set as the power rate of the open loop control in order to prevent the stepping motor 101 from stepping out, and the power rate of 50% that is appropriate for the target speed Vt is set as the power rate of the feedback control. The appropriate power rate refers to a power rate at which appropriate torque can be acquired without waste. If wasteful torque can be eliminated, an effect of reducing vibration or noise can be acquired in addition to saving electric power.

In FIG. 12A, an area "a" is a speed area of the open loop control, and an area "b" is a speed area of the feedback control. When the speed of the stepping motor 101 is decelerated and reaches the open loop control area at the point P1, the feedback control is switched to the open loop control. In order to prevent the stepping motor 101 from stepping out, a relatively high power rate of 90% has to be set as the power rate of the open loop control. As a result, as illustrated in FIG. 12B, a speed level difference ΔVs occurs at a time point T1 when switching is executed.

In order to solve the above issue, in step 1105 in FIG. 11, before control is switched to the open loop control, the power rate is increased to the power rate of 90% of the open loop control while executing control through the feedback control. At the same time, based on the locus data corresponding to the switched power rate (herein, 90%) and the current rotation speed, the advance angle control unit 204 acquires the advance angle that reduces the fluctuation from the current rotation speed as the target advance angle, and starts executing advance angle control to make the advance angle α approximate to the target advance angle. With this processing, the power rate also gradually approximates to the power rate of the open loop control when the advance angle gradually approximates to the target advance angle, so that the power rate can be switched to 90% while the speed is kept approximately constant. Then, processing of switching the feedback control to the open loop control is started when the power rate is switched to 90%.

On the other hand, in step S1103, in a case where the control method selection unit 203 determines that the switching processing is being executed (YES in step S1103), the processing proceeds to step S1106. In step S1106, the control method selection unit 203 determines whether the advance angle α has reached the target advance angle. In a case where the advance angle α has not reached the target advance angle (NO in step S1106), the processing is ended. On the other hand, in a case where the advance angle α has reached the target advance angle (YES in step S1106), the processing proceeds to step S1107. In step S1107, the control method selection unit 203 clears the switching processing flag. Then, in step S1108, the selected state of the open loop control is notified to the advance angle control unit 204 and the power rate control unit 206. With this notification, processing executed by the advance angle control unit 204 and the power rate control unit 206 is switched to the open loop control from the feedback control.

Figure 13:
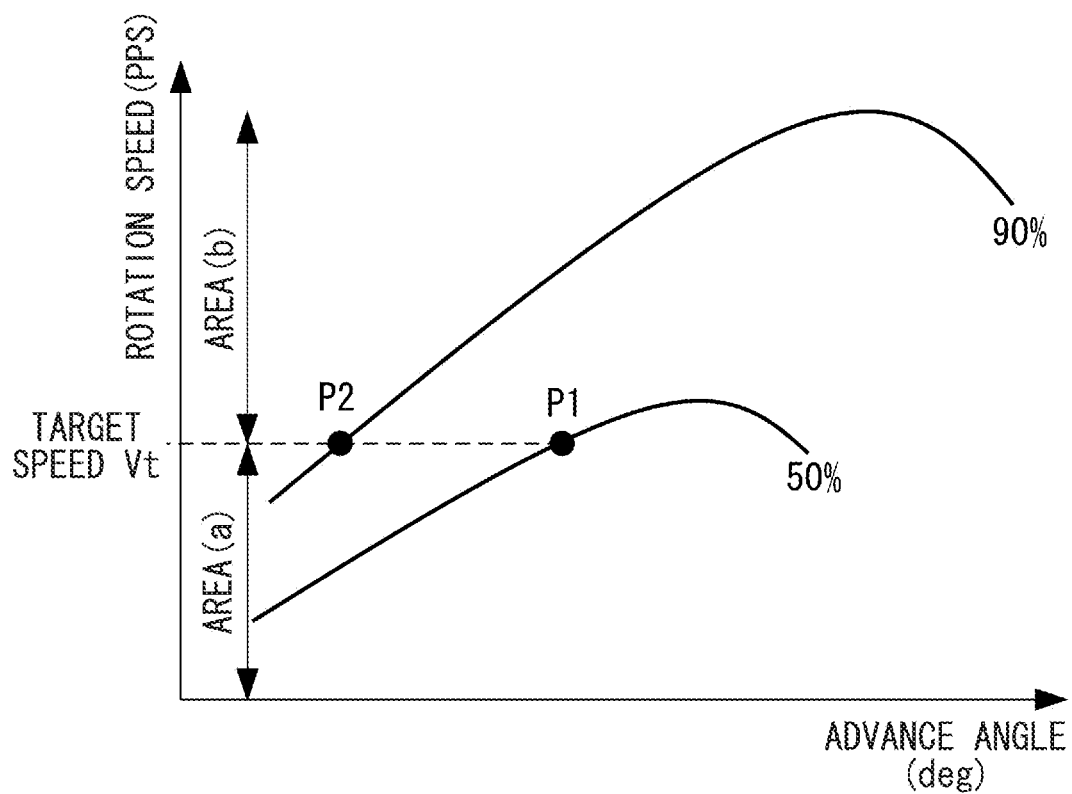
FIG. 13 is a diagram illustrating switching processing of the second exemplary embodiment of a stepping motor, according to one or more aspect of the subject disclosure.

A flow of processing for switching the feedback control to the open loop control will be described with reference to FIG. 13. FIG. 13 is a diagram illustrating switching processing. In the example described below, a relatively high power rate of 90% is set as the power rate of the open loop control in order to prevent the stepping motor 101 from stepping out, and the power rate of 50% that is appropriate for the target speed Vt is set as the power rate of the feedback control.

In FIG. 13, an area "a" is a speed area of the open loop control, and an area "b" is a speed area of the feedback control. The stepping motor 101 is decelerated by the feedback control, and when the speed has reached the open loop control area at the point P1 in step S1102, the power rate of 90% of the open loop control at the point P2 is temporarily set as the power rate in step S1105, and the target advance angle is set as the advance angle P2. Then, the feedback control is continuously executed in a state where the power rate and the target advance angle are respectively set as 90% and the advance angle P2. If the advance angle has reached the advance angle P2 as the target advance angle in step S1106, processing of switching the feedback control to the open loop control is executed in step S1108. While the processing in steps S1105 and S1106 is being executed, the power rate is gradually increased in accordance with change of the advance angle. Therefore, the relationship between the advance angle and the speed is changed along a dotted line that connects the points P1 and P2 in FIG. 13.

In the present exemplary embodiment, data stored the advance angle/speed table 205a is set based on the measurement data of the rotation speed with respect to the advance angle measured previously. Further, although the inclination γ and the offset β of the relational expression 1 generated based on the measurement data and the effective area W of the relational expression 1 are used as the data to be stored in order to reduce the capacity of the advance angle/speed table 205a, the measurement data itself can be stored.

As described above, in the present exemplary embodiment, the control unit 210 acquires a waveform of the control signal which is used for the first control method when the second control method is switched to the first control method. Then, the control unit 210 selects one piece of locus data from the plurality of locus data stored in the memory 205 based on the waveform of the control signal which is used for the first control method, and starts executing control through the first control method after selecting the one piece of locus data. Therefore, according to the present exemplary embodiment, it is possible to reduce the speed level difference occurring when the feedback control is switched to the open loop control.

Subsequently, a third exemplary embodiment of the present disclosure will be described. The present exemplary embodiment relates to the processing executed by the control method selection unit 203 when the open loop control is switched to the feedback control. The present exemplary embodiment particularly relates to a control method described with reference to FIG. 10, which is executed when the control point is switched from the point P1 at which the open loop control is switched to the feedback control to the point P2 at which the power rate is shifted to the appropriate power rate.

Figure 14:
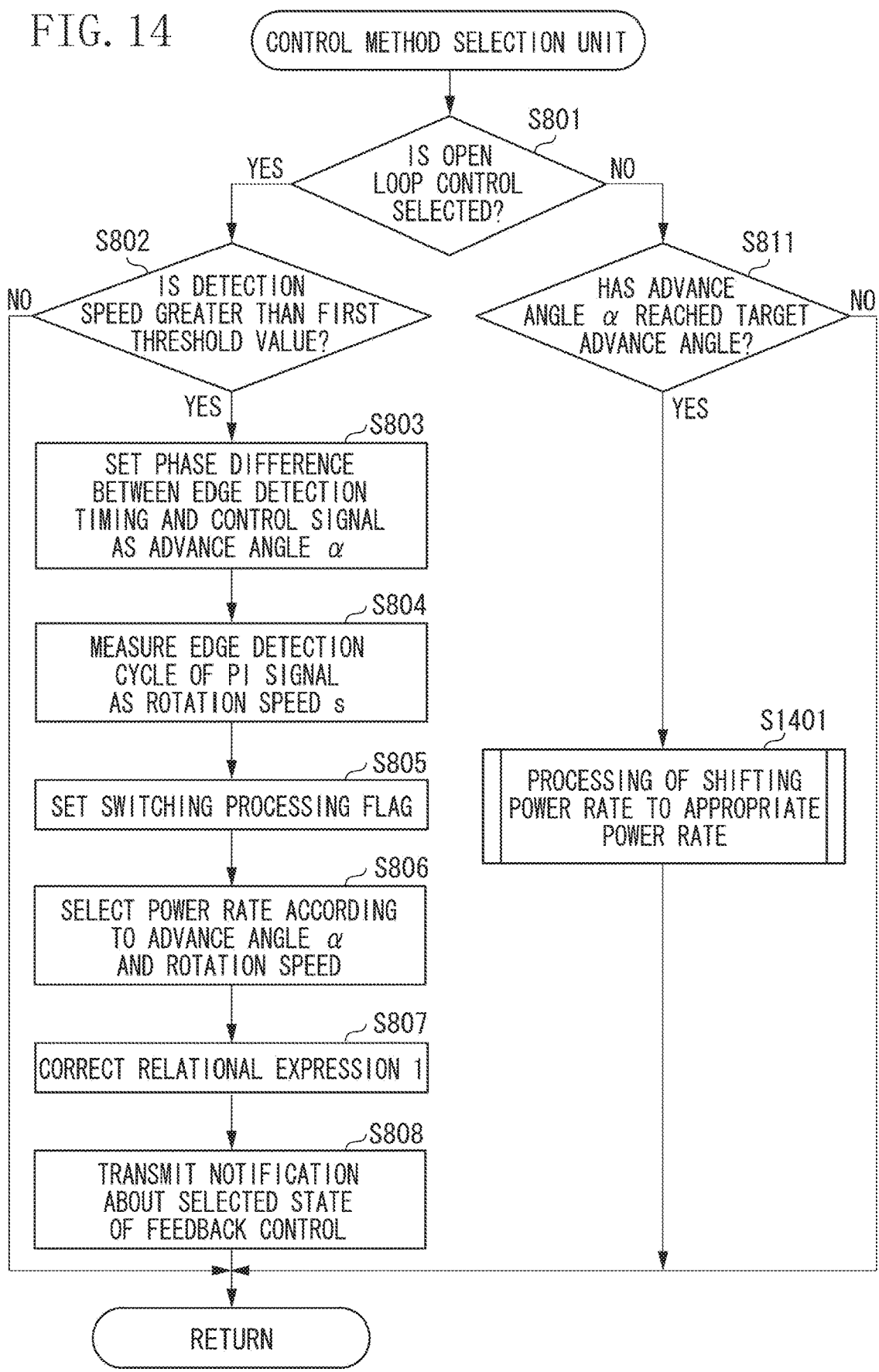
FIG. 14 is a flowchart illustrating processing executed by the control method selection unit of a third exemplary embodiment of a stepping motor, according to one or more aspect of the subject disclosure.
Figure 15:
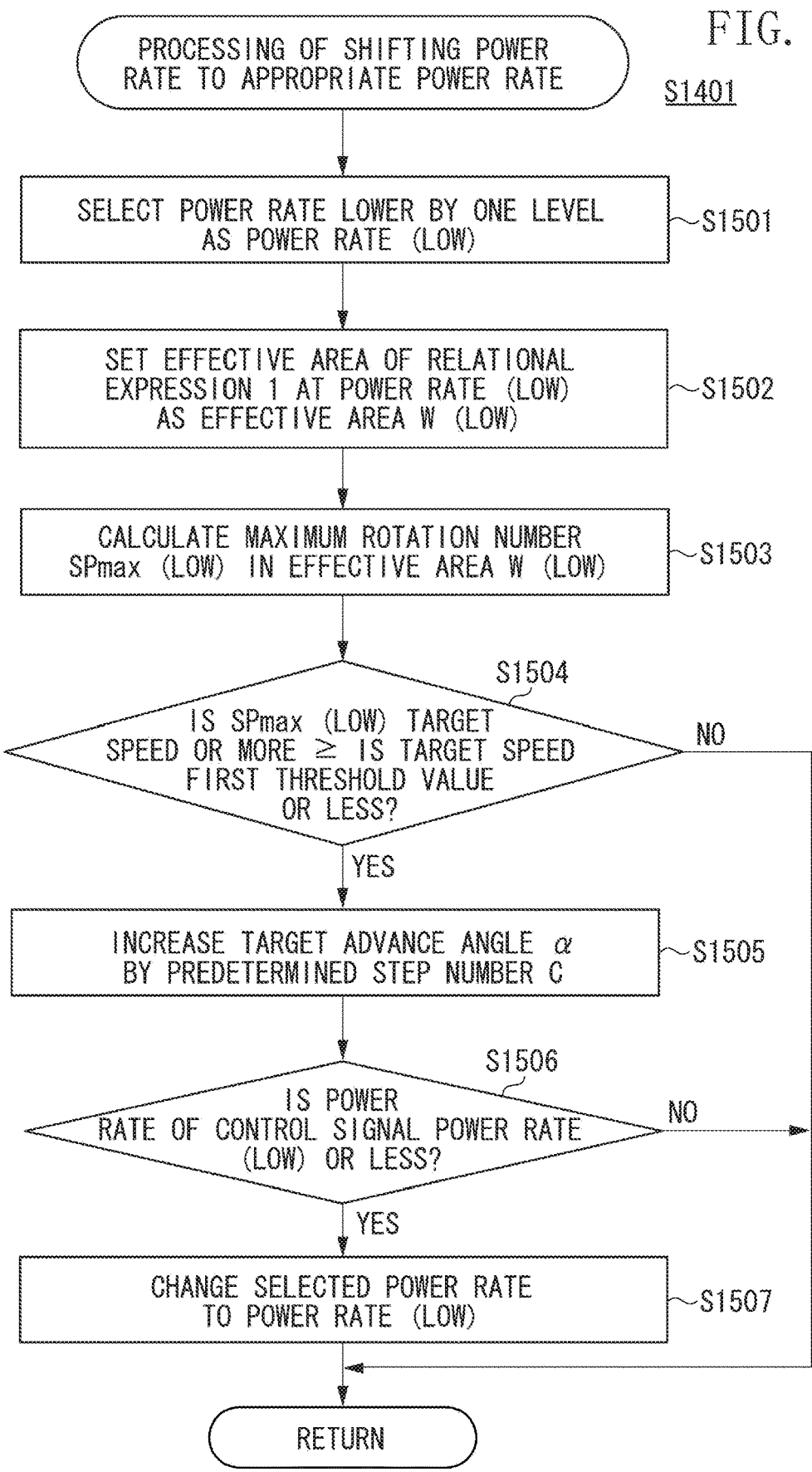
FIG. 15 is a flowchart illustrating processing executed by the control method selection unit of the third exemplary embodiment of a stepping motor, according to one or more aspect of the subject disclosure.

First, processing executed by the control method selection unit 203 of the present exemplary embodiment will be described with reference to FIGS. 14 and 15. FIGS. 14 and 15 are flowcharts illustrating the processing executed by the control method selection unit 203. In FIG. 14, processing indicated by the reference numeral the same as the reference numeral in FIG. 8 is similar to the processing described in the first exemplary embodiment, so that description thereof will be omitted. The present exemplary embodiment is different from the first exemplary embodiment in that the processing in step S812 in FIG. 8 is replaced with the processing in step S1401, i.e., processing of shifting the power rate to the appropriate power rate.

Hereinafter, processing of shifting the power rate to the appropriate power rate executed in step S1401 will be described with reference to FIG. 15. First, in step S1501, with respect to the power rate currently selected in step S806, the control method selection unit 203 selects a power rate lower by one level as the power rate (Low) from among the power rates (parameters) stored in the memory 205. Next, in step S1502, the control method selection unit 203 sets the effective area of the relational expression 1 selected as one of the parameters relating to the power rate (Low) in step S1501 as the effective area W (Low). Next, in step S1503, the control method selection unit 203 calculates a maximum rotation number SPmax (Low) controllable at the power rate lower by one level based on the effective area W (relational expression 1) corresponding to the power rate lower by one level set in step S1502.

In step S1504, the control method selection unit 203 determines whether the maximum rotation number SPmax (Low) is the target speed or more, and determines whether the target speed has not been changed to a value greater than the first threshold value of the switching determination. In a case where the maximum rotation number SPmax (Low) is less than the target speed, or if the target speed has been changed to a value greater than the first threshold value (NO in step S1504), the processing is ended. On the other hand, in a case where the maximum rotation number SPmax (Low) is the target speed or more, and the target speed has not been changed to a value greater than the first threshold value of the switching determination (YES in step S1504), the control method selection unit 203 determines that the power rate can be shifted to the power rate lower by one level, so that the processing proceeds to step S1505.

In step S1505, the control method selection unit 203 increases the target advance angle (advance angle α) y a predetermined step number C. The predetermined step number C is a parameter which is set based on a period in which the power rate is shifted to the power rate (Low), which is determined based on responsiveness of the feedback control at the advance angle control unit 204 and the power rate control unit 206. In step S1506, the control method selection unit 203 compares the power rate of the control signal generated by the control signal generation unit 207 and the power rate (Low), and determines whether the power rate of the control signal has reached the power rate (Low). In a case where the power rate of the control signal has not reached the power rate (Low) (NO in step S1506), the processing is ended. On the other hand, in a case where the power rate of the control signal has reached the power rate (Low) (YES in step S1506), the processing proceeds to step S1507. In step S1507, the control method selection unit 203 changes the currently selected power rate to the power rate (Low). The above processing is executed repeatedly until the selected power rate reaches the lowest selectable power rate (i.e., appropriate power rate).

Figure 16:
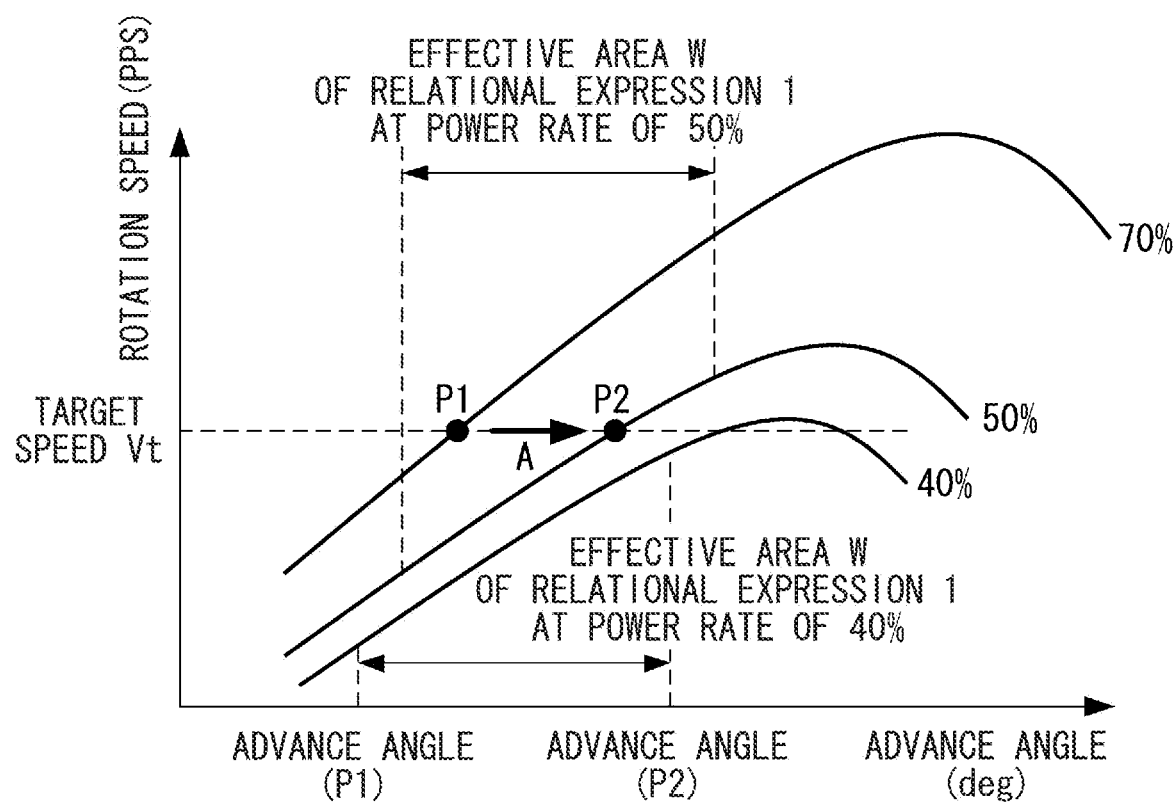
FIG. 16 is a diagram illustrating switching processing of the third exemplary embodiment of a stepping motor, according to one or more aspect of the subject disclosure.

Herein, a state of the feedback control when the processing of shifting the power rate to the appropriate power rate is executed will be described with reference to FIG. 16. FIG. 16 is a diagram illustrating switching processing of the present exemplary embodiment. In the example described below, a relatively high power rate of 90% is set as the power rate of the open loop control in order to prevent the stepping motor 101 from stepping out, and the power rate of 50% that is appropriate for the target speed Vt is set as the power rate of the feedback control. Further, the example described below, the power rate of 70% is selected as the power rate corresponding to the advance angle α and the rotation speed "s" of a time point before the control is switched to the feedback control. In the present exemplary embodiment, although the target speed Vt is set as the rotation speed of a time point when the open loop control is switched to the feedback control, the exemplary embodiment is not limited thereto.

The stepping motor 101 is activated and accelerated through the open loop control, and when the speed has reached the feedback control area at the point P1 in step S802, the advance angle P1 and the rotation speed corresponding to the point P1 before the control is switched to the feedback control are detected in steps S803 and S804. Then, the power rate of 70% corresponding thereto is set in step S806. Then, in a state where the power rate is set to 70%, the open loop control is switched to the feedback control in step S808. After the control is switched to the feedback control, in steps S1505, S1506, and S1507, shifting processing is executed in order to reach the point P2 at which the power rate is shifted to the appropriate power rate. The power rate at which shifting is executable is a parameter which includes a relational expression 1 and an effective area thereof at which rotation with respect to the target speed is executable. In FIG. 16, shifting is executable at the power rates of 70% and 50%, and not executable at the power rate of 40%.

While the target advance angle (advance angle α) is being shifted, the advance angle control unit 204 corrects the phase of the control signal to follow the shifting of the target advance angle (advance angle α). On the other hand, the power rate control unit 206 corrects the power rate of the control signal to suppress a rise in the rotation speed accompanied by shifting of the target advance angle (advance angle α) to keep the rotation speed constant. Through the processing executed by the advance angle control unit 204 and the power rate control unit 206, as illustrated in an arrow A in FIG. 16, the power rate is shifted to the appropriate power rate while keeping the rotation speed constant.

As described above, in the present exemplary embodiment, the control unit 210 determines whether the one piece of locus data selected from a plurality of locus data is the locus data appropriate for the target rotation speed of the stepping motor 101 after the first control method is switched to the second control method. If the control unit 210 determines that the selected one piece of locus data is not the locus data appropriate for the target rotation speed, the control unit 210 adjusts the waveform of the control signal while changing the advance angle to make the rotation speed be constant. Then, the control unit 210 selects one piece of locus data from the plurality of locus data stored the memory 205 based on the adjusted waveform of the control signal, and starts executing control according to the second control method based on the one piece of locus data. It is preferable that the control unit 210 switch the first control method to the second control method when the rotation speed of the stepping motor 101 has reached the first threshold value as the rotation number controllable by the control through the second control method. It is particularly preferable not to execute processing of controlling the waveform of the control signal while changing the advance angle to make the rotation speed be constant if the control unit 210 determines that the target rotation speed of the stepping motor 101 is greater than the first threshold value when the control method is switched to the second control method. Therefore, according to the present exemplary embodiment, it is possible to reduce the speed level difference occurring when the open loop control is switched to the feedback control.

A fourth exemplary embodiment of the present disclosure will be described. The present exemplary embodiment relates to the processing of the control method selection unit. 203 when the feedback control is switched to the open loop control. The present exemplary embodiment particularly relates to a control method described with reference to FIG. 13, which is executed when the control point is switched from the point P1 at which the feedback control is being executed to the point P2 at which the feedback control is switched to the open loop control.

Figure 17:
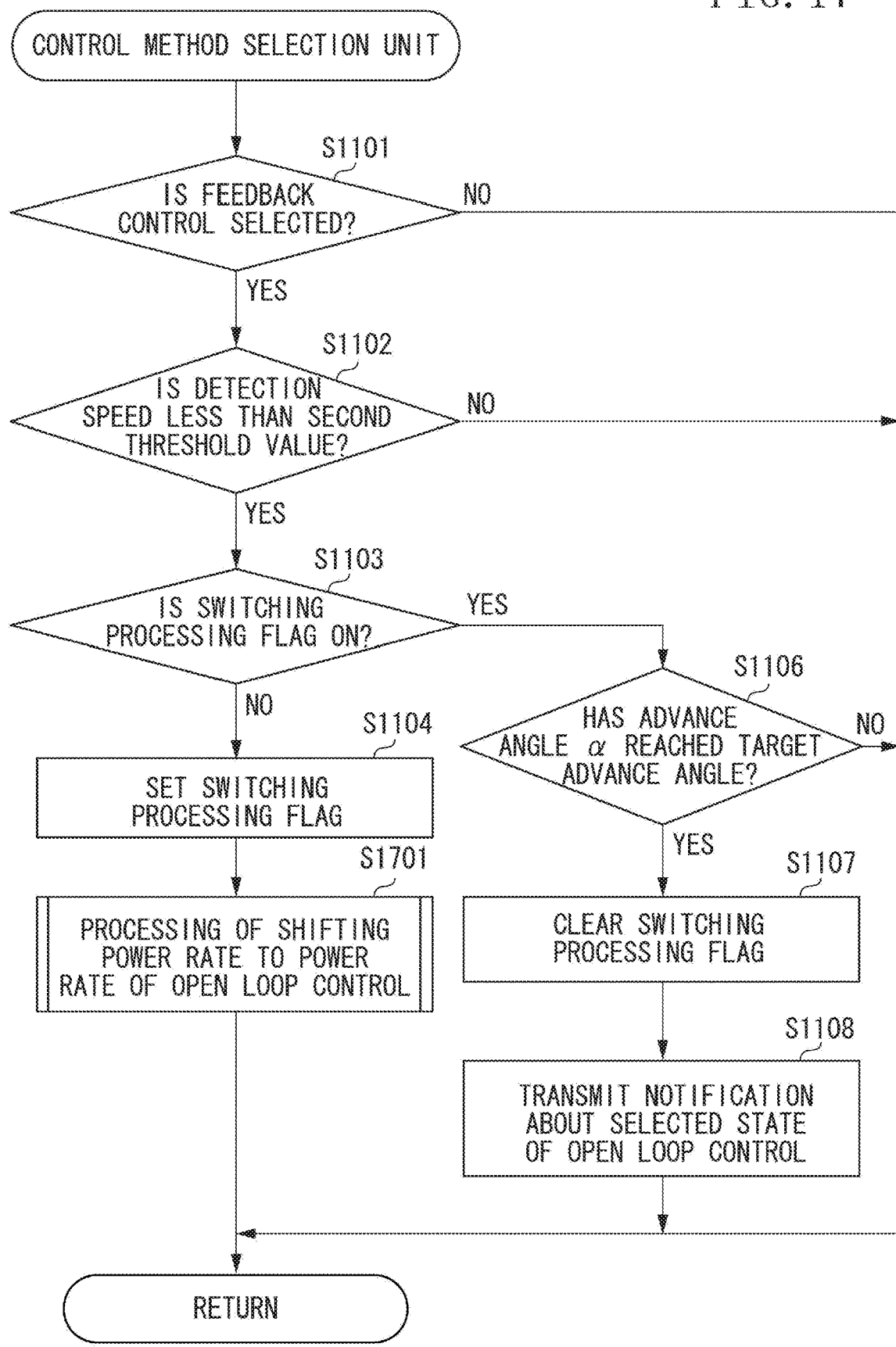
FIG. 17 is a flowchart illustrating processing executed by the control method selection unit of a fourth exemplary embodiment of a stepping motor, according to one or more aspect of the subject disclosure.
Figure 18:
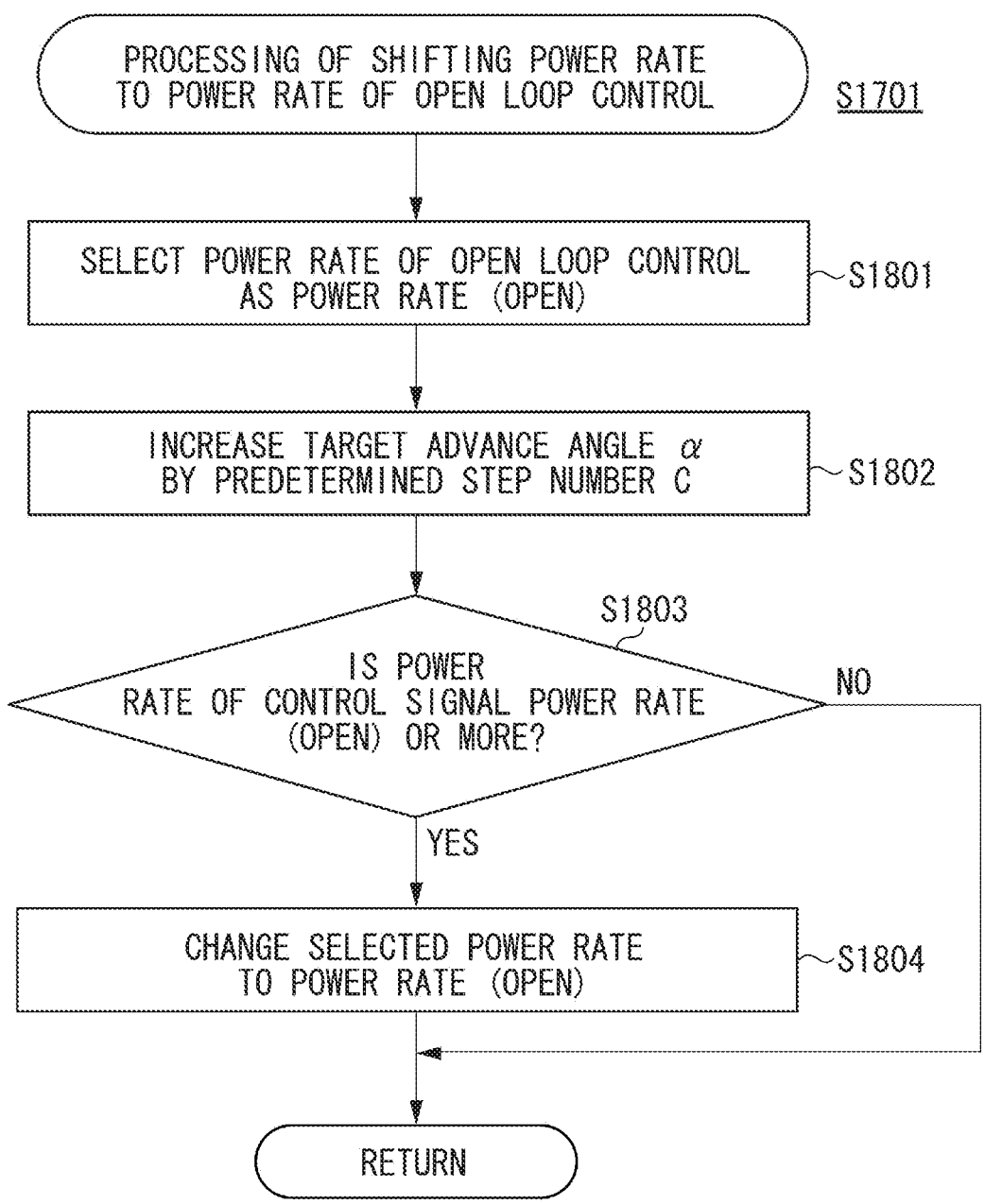
FIG. 18 is a flowchart illustrating processing executed by the control method selection unit of the fourth exemplary embodiment of a stepping motor, according to one or more aspect of the subject disclosure.

First, the processing of the control method selection unit 203 of the present exemplary embodiment will be described with reference to FIGS. 17 and 18. FIGS. 17 and 18 are flowcharts illustrating the processing of the control method selection unit 203. In FIG. 17, processing indicated by the reference numeral the same as the reference numeral in FIG. 11 is similar to the processing described in the second exemplary embodiment, so that description thereof will be omitted. The present exemplary embodiment is different from the second exemplary embodiment in that the processing in step S1105 in FIG. 11 is replaced with the processing in step S1701, i.e., processing of shifting the power rate to the power rate of the open loop control.

Hereinafter, processing of shifting the power rate to the power rate of the open loop control executed in step S1701 will be described with reference to FIG. 18. FIG. 18 is a diagram illustrating the switching processing of the present exemplary embodiment. First, in step S1801, the control method selection unit 203 selects the power rate used for the open loop control as a power rate (Open). In step S1802, the control method selection unit 203 increases the target advance angle (advance angle α) by a predetermined step number C. The predetermined step number C is a parameter which is set based on a period in which the power rate is shifted to the power rate (Open), which is set based on responsiveness of the feedback control at the advance angle control unit 204 and the power rate control unit 206.

In step S1803, the control method selection unit 203 compares the power rate of the control signal generated by the control signal generation unit 207 and the power rate (Open), and determines whether the power rate of the control signal has reached the power rate (Open). In a case where the power rate of the control signal has not reached the power rate (Open) (NO in step S1803), the processing is ended. On the other hand, in a case where the power rate of the control signal has reached the power rate (Open) (YES in step S1803), the processing proceeds to step S1804. In step S1804, the control method selection unit 203 changes the currently selected power rate to the power rate (Open).

Figure 19:
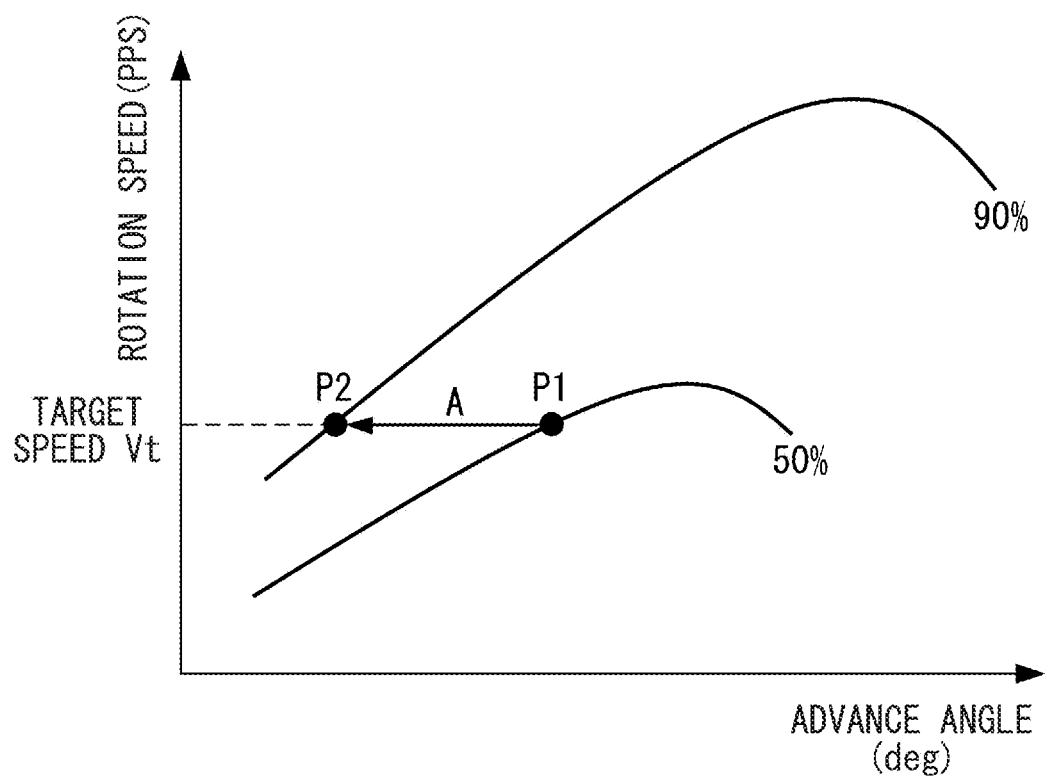
FIG. 19 is a diagram illustrating switching processing of the fourth exemplary embodiment of a stepping motor, according to one or more aspect of the subject disclosure.

Herein, a state of the feedback control when the processing of shifting the power rate to the power rate of the open loop control is executed will be described with reference to FIG. 19. FIG. 19 is a diagram illustrating the switching processing of the present exemplary embodiment. In the example described below, a relatively high power rate of 90% is set as the power rate of the open loop control in order to prevent the stepping motor 101 from stepping out, and the power rate of 50% that is appropriate for the target speed. Vt is set as the power rate of the feedback control.

The stepping motor 101 is decelerated through the feedback control, and when the speed has reached the open loop control area at the point P1 in step S1102, shifting processing is executed in step S1802 to reach the point 52 at which the power rate is shifted to the power rate used for the open loop control.

While the target advance angle (advance angle α) is being shifted, the advance angle control unit 204 corrects the phase of the control signal to follow the shifting of the target advance angle (advance angle α). On the other hand, the power rate control unit 206 corrects the power rate of the control signal to suppress a drop in the rotation speed accompanied by shifting of the target advance angle (advance angle α) to keep the rotation speed constant. Through the processing executed by the advance angle control unit 204 and the power rate control unit 206, as illustrated in an arrow A in FIG. 19, the power rate is shifted to the point P2 as the power rate used for the open loop control while the rotation speed is kept constant. When sifting of the power rate to the point P2 is completed, transition from the feedback control to the open loop control is achieved.

As described above, in the present exemplary embodiment, the control unit 210 adjusts the waveform of the control signal while changing the advance angle to make the rotation speed be constant before the second control method is switched to the first control method. If the waveform of the control signal is adjusted to the waveform of the control signal which is used for the first control method, the control unit 210 selects one piece of locus data from the plurality of locus data stored in the memory 205 based on the adjusted waveform of the control signal. Then, the control unit 210 starts executing control through the first control method after selecting the one piece of locus data Therefore, according to the present exemplary embodiment, it is possible to reduce the speed level difference occurring when the feedback control is switched to the open loop control.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-093592, filed May 10, 2017, which is hereby incorporated by reference herein in its entirety.

What is claimed is:

1. A control device for controlling a stepping motor comprising:
   a memory configured to store a plurality of locus data indicating a relationship between an advance angle and a rotation speed of the stepping motor at each amplitude of a control signal, the advance angle being a phase difference between a phase corresponding to a rotation position of the stepping motor and a phase of the control signal; and
   at least one processor which functions as
   a control unit configured to control the stepping motor through an open loop control method or a feedback control method by using a control signal,
   wherein, in a case where the control unit switches a control method between the open loop control method to the feedback control method, the control unit selects one piece of locus data from the plurality of locus data stored in the memory before switching a control method between the open loop control method and the feedback control method.

2. The control device according to claim 1, wherein the control unit selects one piece of locus data from the plurality of locus data stored in the memory to reduce fluctuation of the rotation speed occurring when a control method is switched between the open loop control method and the feedback control method.

3. The control device according to claim 1, wherein, in a case where the control unit switches the open loop control method to the feedback control method, the control unit
   acquires, before the open loop control method is switched to the feedback control method, the advance angle and the rotation speed while control is being executed through the open loop control method,
   selects the one piece of locus data from the plurality of locus data stored in the memory based on a combination of the advance angle and the rotation speed acquired while control is being executed through the open loop control method, and
   starts executing control through the feedback control method based on the one piece of locus data.

4. The control device according to claim 3, wherein, in a case where the rotation speed of the stepping motor has reached a first threshold value as a rotation number controllable by the control executed through the feedback control method, the control unit switches the open loop control method to the feedback control method.

5. The control device according to claim 4, wherein, in a case where the target rotation speed of the stepping motor is determined to be greater than the first threshold value when the control method is switched to the feedback control method, the control unit switches the open loop control method to the feedback control method without processing of controlling the amplitude of the control signal while changing the advance angle to make the rotation speed be constant.

6. The control device according to claim 1, wherein, in a case where the control unit switches the feedback control method to the open loop control method, the control unit
   selects, before switching the feedback control method to the open loop control method, the one piece of locus data from the plurality of locus data stored in the memory based on the amplitude of the control signal which is used for the open loop control method, and
   starts executing control through the open loop control method after selecting the one piece of locus data.

7. The control device according to claim 6, wherein the control unit
   acquires, before switching the feedback control method to the open loop control method, the rotation speed while control is being executed through the feedback control method, and
   starts executing control through the open loop control method after controlling the stepping motor through the feedback control method based on a target advance angle based on the one piece of locus data and the rotation speed.

8. The control device according to claim 1, wherein the control unit
   adjusts, in a case where it is determined that the one piece of locus data selected from the plurality of locus data is not appropriate for the target rotation speed of the stepping motor after the open loop control method is switched to the feedback control method, the amplitude of the control signal while changing the advance angle to make the rotation speed be constant,
   selects the one piece of locus data from the plurality of locus data stored in the memory based on the adjusted amplitude of the control signal, and starts executing control through the feedback control method based on the one piece of locus data.

9. The control device according to claim 1, wherein, in a case where the control unit switches the feedback control method to the open loop control method, the control unit adjusts the amplitude of the control signal while changing the advance angle based on the one piece of locus data to make the rotation speed be constant through the feedback control method, selects, after adjusting the amplitude of the control signal to an amplitude of the control signal which is used for the open loop control method, executing control through the open loop control method.

10. The control device according to claim 1, wherein the memory stores a parameter acquired by measuring a relationship between the advance angle and the rotation speed as the locus data.

11. The control device according to claim 1, wherein the storage unit stores coefficient data in an approximate expression based on a relationship between the advance angle and the rotation speed acquired through measurement as the locus data.

12. The control device according to claim 1, wherein, in a case where specific locus data based on the relationship between the advance angle and the rotation speed which is detected during control of the stepping motor is not stored in the memory, the control unit selects locus data that is closest to the specific locus data from the plurality of locus data stored in the memory.

13. The control device according to claim 1, wherein, in a case where specific coefficient data based on the relationship between the advance angle and the rotation speed which is detected during control of the stepping motor is not stored in the memory, the control unit corrects the coefficient data stored in the memory.

14. The control device according to claim 1, wherein the locus data is locus data which includes a target rotation speed of the stepping motor, the locus data falling within a range in which a correspondence relationship between the advance angle and the rotation speed is approximated linearly.

15. The control device according to claim 1,
wherein the amplitude of the control signal is an amplitude of the control signal,
wherein the control signal is a pulse width modulation (PWM) signal, and
wherein the amplitude of the control signal corresponds to a duty difference of the PWM signal.

16. The control device according to claim 1, wherein the processor includes a circuit.

17. The control device according to claim 1, wherein, in a case where the control unit switches the open loop control method to the feedback control method, the control unit selects the one piece of locus data from the plurality of pieces of locus data stored in the memory based on a combination of the advance angle and the rotation speed acquired while control is being executed through the open loop control method before switching the open loop control method to the feedback control method, and wherein, in a case where the control unit switches the feedback loop control method to the open loop control method, the control unit selects the one piece of locus data from the plurality of pieces of locus data stored in the memory based on the amplitude of the control signal which is used for the open loop control method.

18. The control device according to claim 17, wherein, in a case where the control unit switches the open loop control method to the feedback control method, the control unit switches the control method by starting control through the feedback control method based on an amplitude of a driving signal corresponding to the one piece of locus data, and wherein, in a case where the control unit switches the feedback control method to the open loop control method, the control unit switches the control method by starting control through the open loop control method after controlling the stepping motor through the feedback control method with an advance angle corresponding to the one piece of locus data as the target advance angle.

19. An optical device comprising:
a stepping motor;
a driven member driven by the stepping motor;
a memory configured to store a plurality of locus data indicating a relationship between an advance angle and a rotation speed of the stepping motor at each amplitude of the control signal, the advance angle being a phase difference between a phase corresponding to a rotation position of the stepping motor and a phase of the control signal; and
a control device configured to control the stepping motor wherein the control device comprising:
at least one of a processor which function as
a control unit configured to control the stepping motor through an open loop control method or a feedback control method by using a control signal,
wherein the control unit selects one piece of locus data from the plurality of locus data stored in the memory before switching a control method between the open loop control method and the feedback control method.

20. A control method comprising:
generating a control signal for controlling a stepping motor; and
controlling the stepping motor through an open loop control method or a feedback control method by using the control signal,
wherein the controlling the stepping motor includes selecting one piece of locus data from a plurality of locus data stored in a storage unit when a control method is switched between the open loop control method and the feedback control method, and
wherein the plurality of locus data indicates a relationship between an advance angle and a rotation speed of the stepping motor at each amplitude of the control signal, the advance angle being a phase difference between a phase corresponding to a rotation position of the stepping motor and a phase of the control signal.

21. A non-transitory computer-readable storage medium which stores a program that causes a computer to execute the control method according to claim 20.

* * * * *